(12) United States Patent
Chen et al.

(10) Patent No.: US 8,315,960 B2
(45) Date of Patent: Nov. 20, 2012

(54) EXPERIENCE TRANSFER FOR THE CONFIGURATION TUNING OF LARGE SCALE COMPUTING SYSTEMS

(75) Inventors: Haifeng Chen, Old Bridge, NJ (US); Wenxuan Zhang, Milpitas, CA (US); Guofei Jiang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 470 days.

(21) Appl. No.: 12/616,477

(22) Filed: Nov. 11, 2009

(65) Prior Publication Data
US 2010/0131440 A1    May 27, 2010

Related U.S. Application Data

(60) Provisional application No. 61/113,365, filed on Nov. 11, 2008.

(51) Int. Cl.
*G06E 3/00* (2006.01)
*G06F 15/18* (2006.01)

(52) U.S. Cl. ............................ 706/15; 370/400; 381/396

(58) Field of Classification Search .................. None
See application file for complete search history.

(56) References Cited

U.S. PATENT DOCUMENTS

2008/0177972 A1* 7/2008 Tan .............................. 711/171
2010/0008224 A1* 1/2010 Lyonnet et al. ............... 370/231

* cited by examiner

*Primary Examiner* — Omar Fernandez Rivas
*Assistant Examiner* — Kalpana Bharadwaj
(74) *Attorney, Agent, or Firm* — Joseph Kolodka; Jeffrey Brosemer

(57) ABSTRACT

A computer implemented method employing experience transfer to improve the efficiencies of an exemplary configuration tuning in computing systems. The method employs a Bayesian network guided tuning algorithm to discover the optimal configuration setting. After the tuning has been completed, a Bayesian network is obtained that records the parameter dependencies in the original system. Such parameter dependency knowledge has been successfully embedded to accelerate the configuration searches in other systems. Experimental results have demonstrated that with the help of transferred experiences we can achieve significant time savings for the configuration tuning task.

4 Claims, 21 Drawing Sheets

Given: the sample population size $\rho$, and two other parameters $\mu$ and $\lambda$ with $u \leq \rho, \lambda \leq \rho$.

Generate the initial population with size $\rho$ by uniform sampling.

Evaluate the samples.

Select $\mu$ samples from the population based on their performance evaluations to create $BN_0$.

For generation $g = 1, 2, \ldots$
    Use $BN_{g-1}$ to generate $\lambda$ new samples;
    Update the $g$th population with the new samples;
    Evaluate the samples;
    Select $\mu$ samples from the $g$th population based on their performance evaluations to create $BN_g$;

End.

FIG. 6

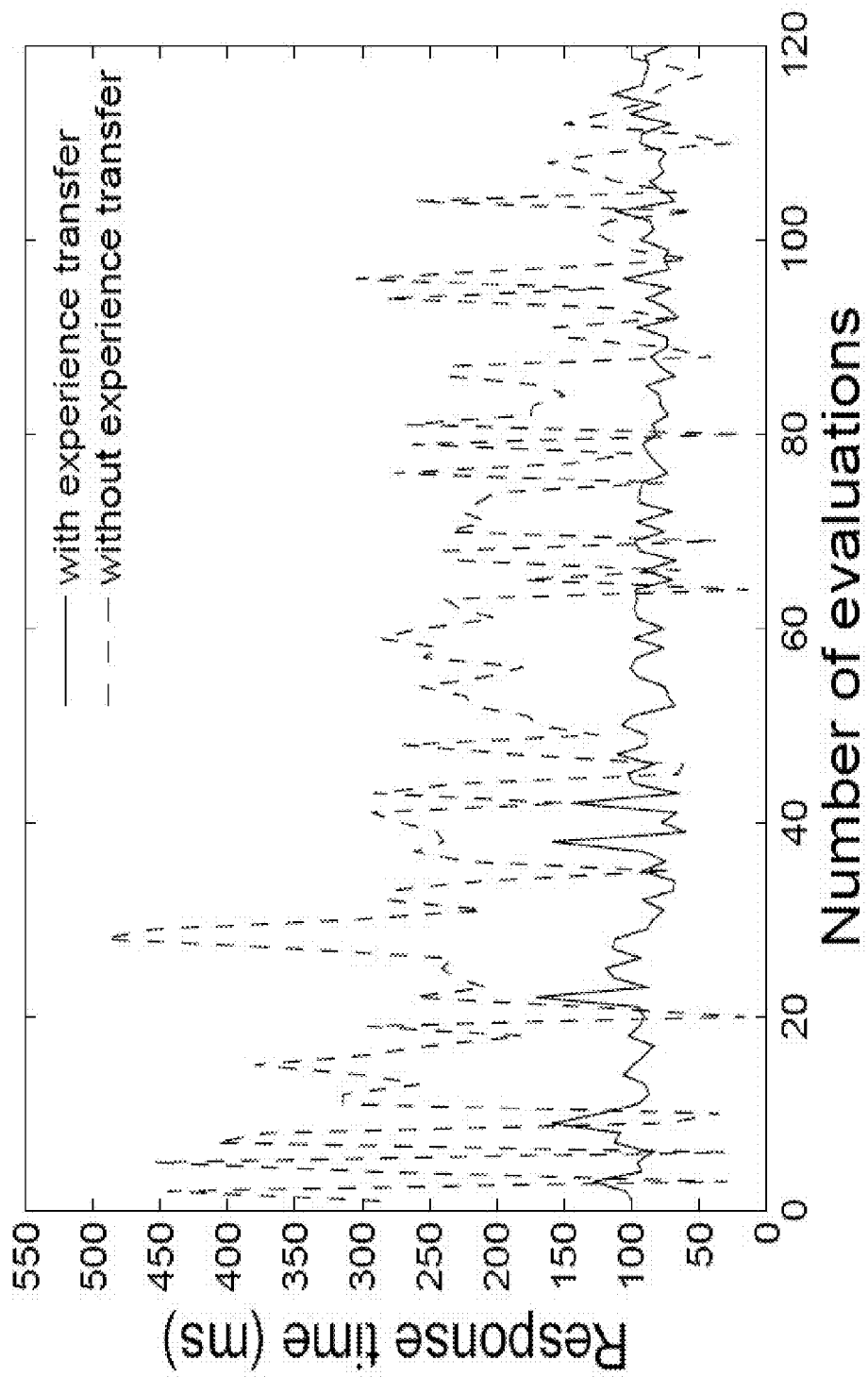

EXPERIENCE TRANSFER FOR THE CONFIGURATION TUNING OF LARGE SCALE COMPUTING SYSTEMS

CROSS REFERENCE TO RELATED APPLICATION

This application claims the benefit of U.S. Provisional Patent Application No. 61/113,365 filed Nov. 11, 2008 which is incorporated by reference as if set forth at length herein.

FIELD OF DISCLOSURE

This disclosure relates generally to computing systems and in particular to a method for transferring experiences of one computing system to another computing system.

BACKGROUND OF DISCLOSURE

As distributed computing systems have become increasingly complex, the management of those systems has become a time-consuming and expensive task. It has been reported that the total cost of ownership (TCO) of enterprise Unix/Linux system is from 5 to 10 times the purchase price of the component hardware and software. As a result, autonomic management tools have been developed which utilize knowledge of system experts or historical data to automate management tasks.

Representative works include: T. Ye and S. Kalyararaman, *A recursive random search algorithm for large-scale network parameter configuration*, which appeared in Proceedings of the International Conference on Measurement and Modeling of Computer Systems (SITMETRICS'03), pages 196-205, 2003; b. Xi, Z. Liu, M. Raghavachari, C. H. Xia, and L. Zhang, *A smart hill-climbing algorithm for application server configuration*, which appeared in Proceedings of the 13$^{th}$ international conference on World Wide Web (WWW '04), pages 287-296, 2004; and A. Saboori, G. Jiang, and H. Chen, *Autotuning configurations in distributed systems for performance improvements using evolutionary strategies*, In 28$^{th}$ IEEE International Conference on Distributed Computing Systems (ICDCS '08), 2008.

While current autonomic management solutions focus on the knowledge discovery and modeling to benefit the management in the same system, it may be appreciated by those skilled in the art that it is also important to utilize the knowledge of one system to facilitate the management of other systems. Such a thesis is supported observations made in the system management practice. For example, many special kinds of systems, such as online banking systems, usually run on similar platforms, i.e., the J2EE based infrastructure, to support applications with similar business logics.

As may certainly be appreciated by those skilled in the art, if we learn the behavior of one system and transfer the learned knowledge to other similar systems, then it is not necessary to spend the same amount of effort and time to model the new system. Furthermore, since contemporary systems typically evolve frequently due—for example—to hardware upgrades, software version changes, topology changes, and so on. In such situations, the previous model of system management may not be valid or optimal anymore after the system undergoes changes. Additionally, it is generally not practical to relearn the system from scratch as such relearning requires extra time and data. Therefore, if we can discover useful experiences from the management of previous systems and reuse them in the current system, the system can become more robust and adaptive to the environmental changes.

SUMMARY OF DISCLOSURE

An advance is made in the art according to an aspect of the present disclosure directed to a computer implemented method for transferring useful experiences from the management of systems and reusing them in other systems thereby producing systems exhibiting a greater robustness while being more adaptive to environmental changes.

Toward this end the present disclosure describes a method we call 'experience transfer', to transfer knowledge about an original system $S_0$ to benefit the management of another similar, new system $S_1$. As will be explained, a transfer process according to an aspect of the present disclosure includes three main components, namely: (1) the discovery and representation of experiences that can be transferable between the two systems; (2) the extraction of experiences during the modeling process in the original system $S_0$; and (3) the embedding of learned experiences into the management of the new system $S_1$.

The transferable experiences usually vary according to different management tasks and must reflect common characteristics of two systems and can be helpful to the management task.

BRIEF DESCRIPTION OF THE DRAWING

A more complete understanding of the disclosure may be realized by reference to the accompanying drawing in which:

FIG. 6 is a pseudocode listing showing configuration tuning based on Bayesian network construction and sampling;

FIGS. 13(a), 13(b) and 13(c) are a series of graphs showing results of tuning a node-added system: 13(a) response time; 13(b) throughput; and 13(c) utility.

DESCRIPTION OF EMBODIMENTS

Figure 1:
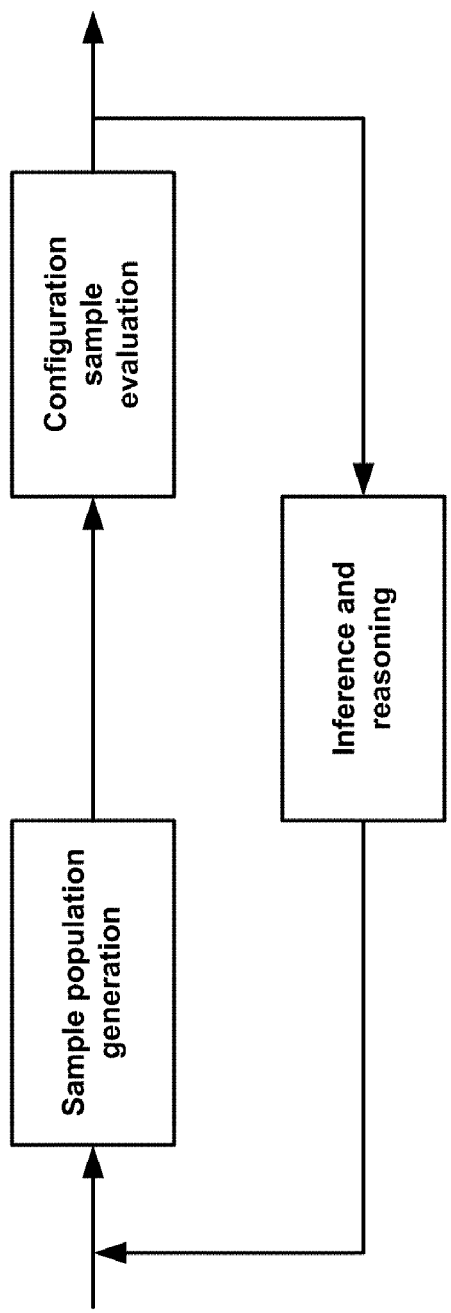
FIG. 1 is a simple block diagram depicting sampling-based system configuration tuning.

The following merely illustrates the principles of the various embodiments. It will thus be appreciated that those skilled in the art will be able to devise various arrangements which, although not explicitly described or shown herein, embody the principles of the embodiments and are included within their spirit and scope.

Furthermore, all examples and conditional language recited herein are principally intended expressly to be only for pedagogical purposes to aid the reader in understanding the principles of the embodiments and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGs. are conceptual only. Their function may be carried out through the operation of program logic, through dedicated logic, through the interaction of program control and dedicated logic, or even manually, the particular technique being selectable by the implementer as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicants thus regard any means which can provide those functionalities as equivalent as those shown herein.

Unless otherwise explicitly specified herein, the drawings are not drawn to scale.

By way of some additional background, we note that for our purposes herein we use system configuration tuning as an exemplary application to demonstrate the process of experience transfer as well as the benefits introduced by the transfer.

Configuration tuning is known to be an important task for computing systems since an appropriate configuration setting can affect a system's quality of services (QoS) characteristics such as short response time, high throughput, and fairness among users.

For our purposes herein, experience is related to the knowledge or skill in managing the computing systems. With the help of experience, many system management tasks can be achieved more effectively. For example, if we have the experience of 'whenever the CPU utilization is above 90, that server machine must be approaching its performance bottlenecks', we can always rely on such knowledge to check the status of other server machines. However, with the increasing complexity of computing systems, a lot of their management experiences cannot be explicitly expressed as the above rules. Some advanced techniques have to be involved to analyze the system operation and build mathematical models to represent such experiences. For instance, in the configuration tuning task that we will describe in detail, the experience is expressed as the hidden dependencies among system attributes, which cannot be manually specified by system operators. Instead, we propose to use Bayesian based learning technique to discover and utilize the experience. As a consequence, the efficiency of configuration search can be significantly improved.

As is known, recent attempts at improving system performance have generally focused on tuning configuration parameters. Such approaches tend to treat these systems as a "black-box" and simply apply sampling based optimization to identify optimal configurations. Such sampling based configuration is a very time-consuming process and may take upwards of tens of minutes to evaluate one single configuration sample because various workload situations have to be considered during the evaluation process to obtain reliable performance data. Since a common configuration search usually involves the evaluations of at least hundreds of samples, it would take several days or even weeks to complete the tuning task. Due to the "expense" of such configuration tuning, it is highly desired if we can use the knowledge learned from the tuning process in other (or previous) systems to speed up the tuning in the current system.

During configuration tuning, we note that knowledge of dependencies between different configuration parameters plays an important role to discover the optimal configuration setting. As may be appreciated, such knowledge may be helpful to avoid any unnecessary sample evaluations and thus accomplish the configuration search more quickly.

For instance, if an increase of a configuration parameter, say $c_A$, always introduces the increase of another parameter $c_B$ as well—in order to improve the system performance—we do not have to generate samples with high $c_A$ and low $c_B$ values because such value pairs will not improve the system performance. Furthermore, we observe that most dependencies between configuration parameters are usually unchanged across similar systems because those systems are built on same infrastructures that support applications with similar business logics. The consistency of parameter dependencies in similar systems has also been verified in the experimental results. Therefore, if we can extract the parameter dependencies during the configuration tuning in $S_0$, such knowledge can be utilized to speed up the tuning process in system $S_1$.

In light of the above observations, the method according to an aspect of the present disclosure considers the dependencies between configuration parameters as valuable experiences and uses a Bayesian network—a well-known technique in machine learning—to represent those experiences. As can be appreciated by those skilled in the art, the Bayesian network is particularly useful for our purposes due—in part—to its capability to model the parameter dependencies.

In order to facilitate the experience extraction and transferring, we employ a new configuration tuning algorithm based on the Bayesian network construction and sampling. Given a number of evaluated configuration samples, a Bayesian network is constructed to estimate the dependencies between configuration parameters, through which a non-deterministic induction is employed to infer the structure of configuration space, and to guide the generation of new samples towards the optimal region. Each time new samples have been evaluated, the Bayesian network is also updated to improve the model accuracy followed by the inference process to create the next generation of samples. Such iterative sample generation and inference makings will eventually converge to the best configuration setting of the system. More importantly, we also obtain a Bayesian network as the byproduct of configuration tuning, which records the dependencies between system configuration parameters. The learned Bayesian network can serve as transferable experiences to benefit the configuration tuning in the other system $S_1$. That is, we still use the Bayesian network based configuration tuning to search the optimal configuration in $S_1$. However, rather than starting with empty knowledge about configuration dependencies, we use the dependency graph learned from $S_0$ to drive the configuration search so that the configuration tuning in $S_1$ can be significantly accelerated.

In order to test our experience transfer method, we build a web based test bed system and denote it as $S_0$. The Bayesian network based tuning algorithm is applied to discover the optimal configuration in $S_0$ as well as learn the network structure that reveals any parameter dependencies in $S_0$. Subsequently, we change the test bed system in three different ways to reflect commonly encountered scenarios in real system evolutions: the hardware upgrade, the software version change, and the topology change by adding a node. In each upgraded system, we embed the Bayesian network learned from $S_0$ into the configuration tuning process, and compare the efficiencies of configuration searches with and without the help of transferred experiences. Results show that our transferred dependency knowledge can significantly accelerate the configuration search in all three upgraded systems, which in consequence leads to tremendous time savings for system operators in tuning the system performance.

The performance of a computing system depends significantly on the values of its configuration parameters. It is necessary to discover the optimal configuration setting that can bring the best system performance such as short response time, high throughput, and fairness among users. Given p configuration parameters of a system $x=[x_1, x_2, \ldots, x_p]^T$, if we use a function $f(x_1, x_2, \ldots, x_p)$ to represent the system performance with respect to its various configuration settings, the configuration tuning is actually to solve the following optimization problem:

$$[\tilde{x}_1, \tilde{x}_2, \ldots, \tilde{x}_p] = \operatorname{argmax}_{x_1, x_2, \ldots, x_p} f(x_1, x_2, \ldots, x_p). \quad (1)$$

In practice, the function $f(\cdot)$ is usually unknown. We have to treat the system as a black-box and apply sampling based optimization to discover the optimal configuration. As described in FIG. 1, sampling based approach starts with selecting a number of configuration samples, each of which represents a specific system configuration setting. After the configuration samples have been evaluated for the system performance, the method makes an inference about the location of optimal configuration in the search space. Such inference provides feedbacks to the generation of next round sample populations. With such iterative sample generation and inference(s), the search process will eventually discover the optimal configuration of the system.

Sampling based configuration tuning is quite time-consuming considering that a common sample evaluation would take tens of minutes and the tuning process usually requires several hundreds or even thousands of sample evaluations. In order to improve the tuning efficiency, various inference and reasoning methods have been proposed in recent years, which attempted to identify the optimal configuration with a minimum number of sample evaluations.

Despite these attempts, configuration tuning remains an expensive task which still requires hundreds of sample evaluations. Accordingly, our inventive method employs a technique we call 'experience transfer', to deal with the search efficiency issue in configuration tuning. According to as aspect of the method, rather than starting the configuration search from scratch, the experience transfer borrows configuration tuning experiences from other similar systems to accelerate the search process in the current system. If we can extract those properties from the configuration tuning in one system, they can serve as valuable experiences to accelerate the tuning in other systems.

Figure 2:
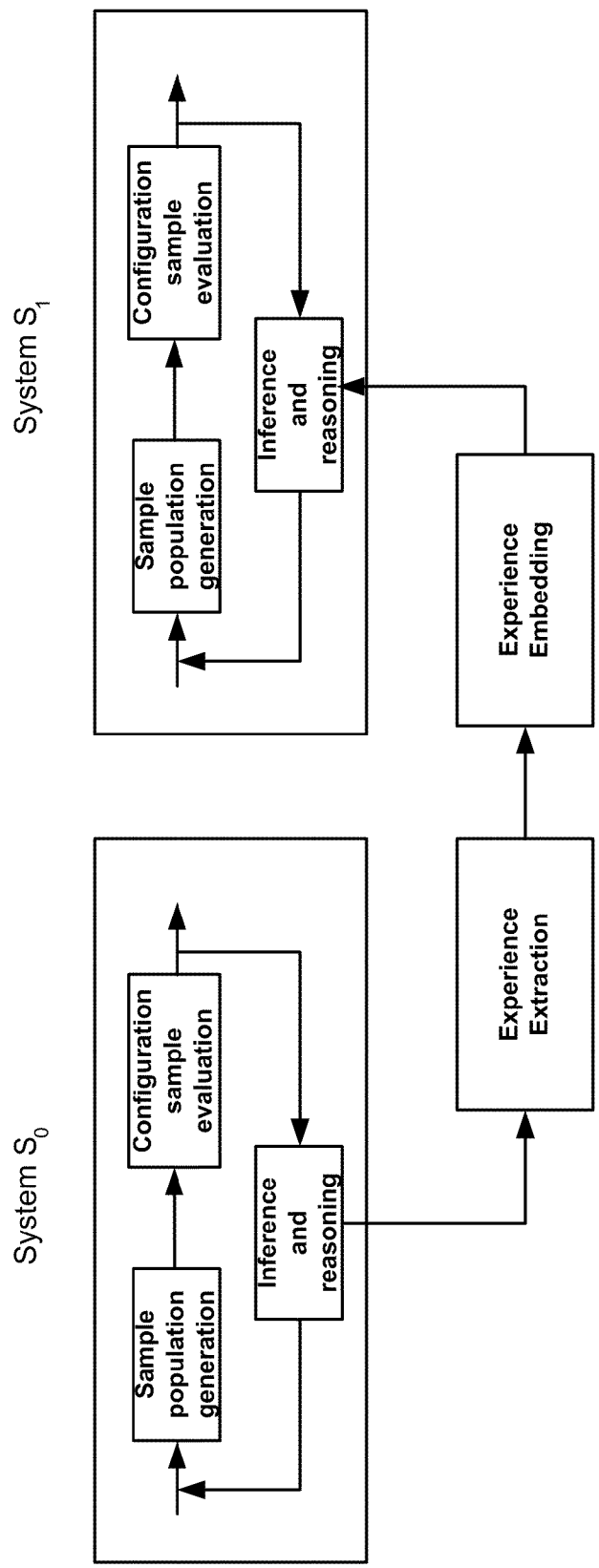
FIG. 2 is a simple block diagram depicting experience transfer from a first system to a second system for the purposes of configuration tuning.

FIG. 2 shows a simplified diagram depicting experience transfer in configuration tuning according to an aspect of the present disclosure. As may be observed from that FIG. 2, the method includes two main stages: the experience extraction, and the experience embedding.

The experience extraction stage involves the modeling and extraction of configuration tuning experiences from the original system $S_0$. Experience embedding involves the utilization of extracted experiences to facilitate the configuration tuning in another system $S_1$. The experimental results described later will show that with the help of transferred experiences, the efficiency of configuration tuning in system $S_1$ can be significantly improved.

We now may consider a number of questions relevant to the experience transfer between two systems $S_0$ and $S_1$, namely: 1) what kinds of experiences are useful to the configuration tuning and can be transferred? 2) how do we represent the experiences?; and finally 3) how do we extract the experiences from system $S_0$?

As may be appreciated, the transferable experiences must contribute to the efficiency improvement of the configuration search. The experiences have to reflect common characteristics of two systems so that they can remain valid after transferred to the new system. One type of experience model in configuration tuning is the 'point transfer', which uses the optimal configuration setting in $S_0$ as the transferred experience.

In system $S_1$, the configuration search starts with initial samples located in the neighborhood of the transferred configuration setting. Such experience representation assumes that the two systems share the same optimal region in the configuration space. In reality, however, the optimal configurations in two systems may be located far away in the configuration space, even if the two systems have a lot of structural similarities or share other features.

For example, if we add more memory to upgrade the system $S_0$, the optimal settings for those memory related configuration parameters in the upgraded system $S_1$ may be totally different from the original ones in $S_0$. The transferred configuration values from $S_0$ are not useful anymore in the upgraded system. Such a fact will also be confirmed in our experimental results described later.

We begin by noting that the following observations can lead us to build the experience model in configuration tuning.

The configuration parameters are usually dependent on each other in computing systems. For example, the configurations of application servers in the web based system depend heavily on the particular application being deployed and the type of backend database it interacts. For example, others have noted that in order to obtain good performance in a three-tiered web system, the number of threads at any downstream station should always be larger than its upper stream of transaction flow.

If we have knowledge of dependencies between configuration parameters, the configuration tuning process can be significantly accelerated because we can avoid a lot of unnecessary sample evaluations during the configuration search. For example, if we know that a parameter MaxClients in a web server should always be smaller than the MaxConnections parameter in the database server in web based systems, we do not have to generate configuration samples with high MaxClients and low MaxConnections values because those samples will lead to the blocking of user requests and hence will not contribute to the performance improvement.

Most of the dependency relationships between configuration parameters are usually consistent across two systems as long as they are running on the same platform, i.e., the J2EE based infrastructure, and share similar application logics. This is because the low level mechanisms that support the behaviors of two systems are the same. Experiments and verified the consistency of configuration dependencies in two similar systems.

Because of these, we consider the dependencies between configuration parameters as valuable experiences in configuration tuning, and utilize such experiences to improve the efficiency of tuning process. We use the Bayesian network to learn parameter dependencies given a number of configuration samples, and to record such dependencies in a network structure. A novel configuration tuning algorithm is also described based on the Bayesian network construction and reasoning. As a consequence, we can obtain a Bayesian network after the tuning has been completed, which can serve as learned experiences from the configuration tuning in $S_0$.

Our tuning follows the framework described in FIG. 1. The inference and reasoning of the tuning process are accomplished by modeling the joint distribution $P(x_1, \ldots, x_p)$ of configuration parameters, $x=[x_1, x_2, \ldots, x_p]$, to reflect the underlying performance function $f(x_1, x_2, \ldots, x_p)$ described in (1). That is, if the distribution $P(\cdot)$ has high probabilities in regions with good performance evaluations and low probabilities in other areas in the configuration space, we can always drive the new sample generation towards the peak region of that distribution to obtain the optimal configuration.

For our purposes herein, we choose the Bayesian network to model the joint distribution because it offers several advantages over alternative modeling approaches such as a multivariate Gaussian. For example, the Bayesian network relies on the solid probabilistic theory to process the uncertain information, which can reduce the ambiguities caused by data insufficiency or data noises. Furthermore, unlike some models such as the neural networks, which usually appear to users as a 'black-box', all the parameters in the Bayesian network have understandable semantic interpretations.

The Bayesian network models the joint distribution by learning the dependencies between variables and encoding such dependencies into the joint distribution. It represents the learned variable dependencies as a graphical network, in which each node corresponds to one variable and the directed arcs are drawn to illustrate the dependency relationships between the nodes. The semantics of the Bayesian network are simple: each node is conditionally independent from its non-descendents given its parents. As a result, the joint probability can be expressed as $$P(x_1, \ldots, x_p) = \prod_{i=1}^{p} P(x_i \mid Pa_i) \qquad (2)$$

where $Pa_i$ is the set of parent variables of $x_i$ in the network (corresponding to those nodes from which there exists an edge to $x_i$) and $P(x_i|Pa_i)$ denotes the conditional probability of $x_i$ given its parents $Pa_i$.

Figure 3:
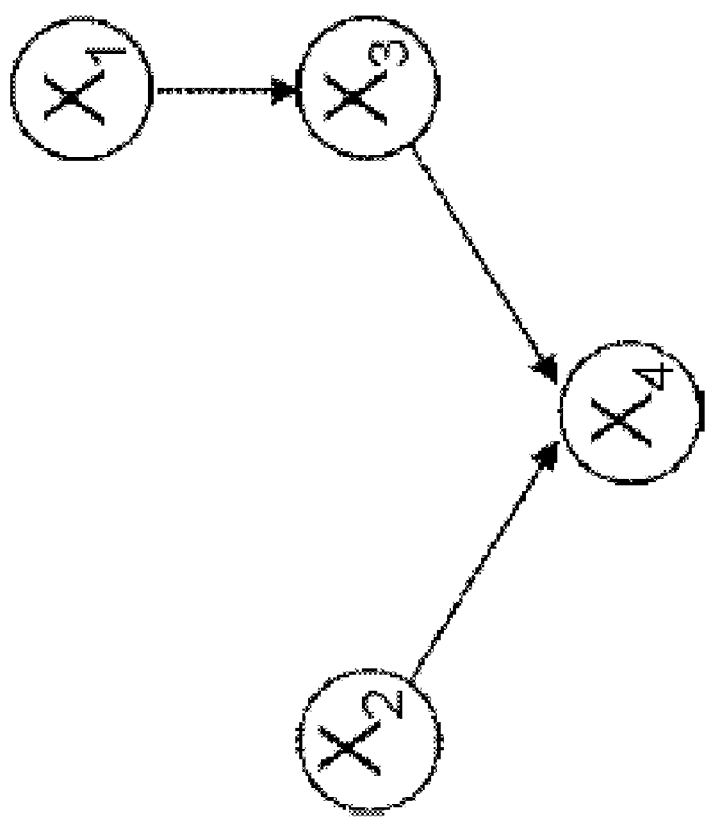
FIG. 3 is a schematic diagram of a Bayesian network.

For instance, in a simple network structure shown in FIG. 3, we can see that given the values of $x_2$ and $x_3$, the variables $x_1$ and $x_4$ are independent. Such dependency knowledge can be used to factorize the joint probability $$P(x_1,x_2,x_3,x_4)=P(x_1)P(x_2)P(x_3|x_1)P(x_4|x_2,x_3) \qquad (3)$$

so that the distribution space can be represented much more compactly. In terms of the configuration tuning task, if we can learn such dependency network, we can significantly reduce the search space with the help of probability factorization, and hence complete the configuration search more efficiently.

In order to use the Bayesian network as the inference and reasoning engine for configuration tuning, we need to complete two tasks. The first one is to construct the Bayesian network given a population of configuration samples. The outputs of such a procedure include the network structure that represents the dependency relationships between configuration parameters, as well as the joint distribution model that has been encoded by the dependency knowledge.

Bayesian network construction is a widely known process. However, most previous methods focused on discrete variables and used variable discretization to handle continuous attributes, which may lead to poor accuracy of the model. While there have been methods of using parametric distribution to deal with continuous variables, those approaches usually assume that the conditional distributions of continuous variables are either Gaussian or a mixture of Gaussians. Later, we will introduce a more general method to build the network, which does not require any distribution assumptions for continuous variables.

Once the Bayesian network has been constructed, the second task is to guide the sample generation based on such a network so that the new configuration samples can be located in the promising regions in the configuration space. We will describe such a process and will also describe the whole configuration tuning process based on the Bayesian network construction and inferences. We will show that such an algorithm will eventually discover the optimal configuration of the system. Furthermore, after the search is completed, we can obtain a Bayesian network that accurately describes the dependencies between configuration parameters. Such a network will serve as the learned experiences from the configuration tuning in system $S_0$ and can be transferred to benefit the configuration tuning in other similar systems.

The construction of Bayesian network can be decomposed into the problems of learning the network structure and learning the network parameters. While the first attempts to identify the topology of the network, the parametric learning concerns the modeling of joint parameter distribution based on the learned topology. Note that we assume each variable can be either categorical or continuous. As a result, most of the previous methods for building the Bayesian network, which requires discrete data representations, cannot be used here. Instead we present the following way to construct the Bayesian network.

Figure 4:
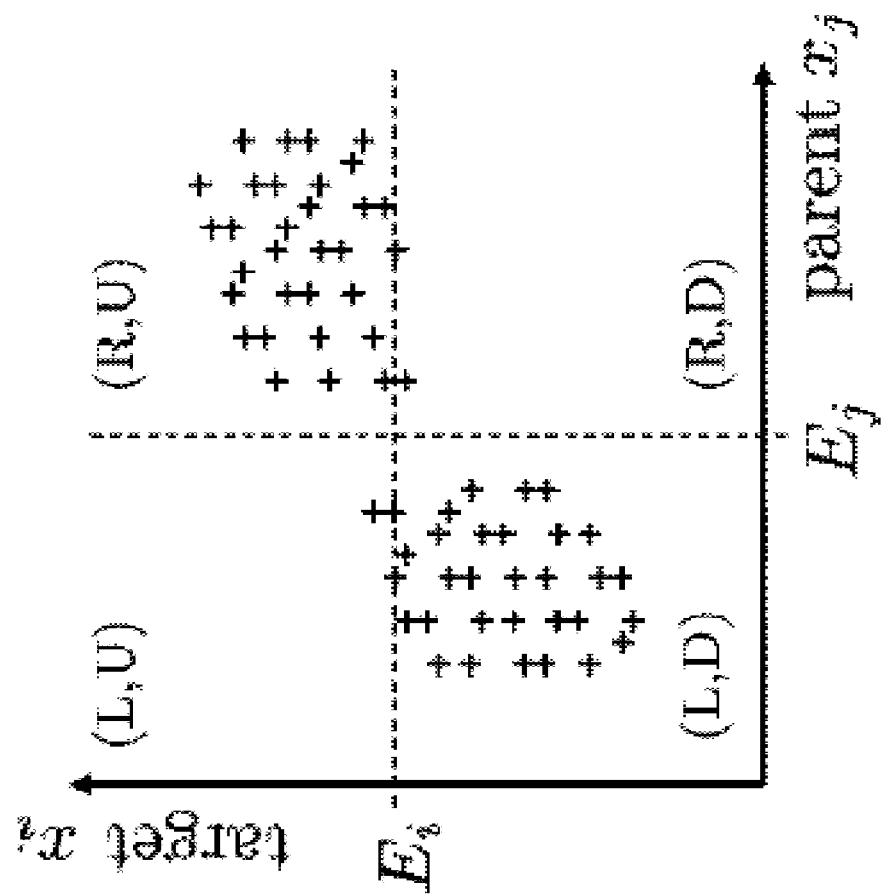
FIG. 4 illustrates the identification of a number of parent variables used in the construction of the Bayesian network.

The learning of the network structure is a NP-hard problem since the number of possible networks on p configuration parameters is super-exponential in p. However, if we know the ordering of nodes in the network, the structure learning will become much simpler. That is, if we can discover the set of parent variables, $Pa_i$ as described in equation (2), for each variable $x_i$, the Bayesian network structure can be constructed in an incremental way. For each target variable $x_i$, we adopt a method to discover its parent variables and build a decision tree to represent its dependency relationships. At the beginning, all the remaining variables are considered as possible candidates for the parent of $x_i$. The idea of a classification and regression tree (CART) is then employed to extract the parameter that best separates $x_i$ values in the given samples. For each candidate $x_j$, we add a binary split by choosing a boundary $E_j$ along the $x_j$ axis so that the data are divided into two parts (based on $x_j \leq E_j$ and $x_j > E_j$). If the parameter $x_j$ is the parent of the target $x_i$, there must exist at least one boundary point $E_j$ such that the distributions of $x_i$ will be significantly different in two splitted data branches. FIG. 4 shows such an example, in which we can see that $x_j$ heavily influences $x_i$ because there exits a splitting point $E_j$ such that the $x_i$ values in the splitted two data parts, left and right sides of the vertical line, exhibit strong distribution differences. On the left side of the vertical line, most of the $x_i$ values are smaller than $E_i$ (the horizontal line), whereas the $x_i$ values in the right side samples are mostly above the $E_i$ line. Because of such strong distribution differences caused by the separation $x_j \leq$ (or $>$) $E_j$, the parameter $x_j$ can be regarded as the parent of $x_i$.

In order to quantitatively measure the distribution differences of $x_i$ due to the splitting boundary $E_j$ in the $x_j$ axis, we define the following Bayes-Dirichlet metric:

$$Diff(E_j) = \max_{E_i \in x_i} \frac{\Gamma\left(\sum_{r \in \{L,R\}} \sum_{s \in \{U,D\}} (n_{r,s}+1)\right)}{\left[\prod_{s \in \{U,D\}} \Gamma\left(\sum_{r \in \{L,R\}} (n_{r,s}+1)\right)\right]} \times \frac{\prod_{r \in \{L,R\}} \prod_{s \in \{U,D\}} \Gamma(n_{r,s}+1)}{\left[\prod_{r \in \{L,R\}} \Gamma\left(\sum_{s \in \{U,D\}} (n_{r,s}+1)\right)\right]} \quad (3)$$

where $\Gamma(\cdot)$ represents the Gamma function $\Gamma(n)=(n-1)!$ and $\{n_{L,U}, n_{R,U}, n_{L,D}, n_{R,D}\}$ represent the number of points in each quadrant produced by the splitting point $E_j$ in the $x_j$ axis (the vertical line in FIG. 4) as well as the splitting point $E_i$ in the $x_i$ axis (the horizontal line in FIG. 4). Large Diff ($E_j$) values represent strong distribution differences in $x_i$ values between the two branches of samples separated by the splitting boundary $E_j$ in the $x_j$ axis. Given a specific $E_j$ value, the metric Diff ($E_j$) is obtained by searching the $E_i$ values in $x_i$ axis to select the one that can best discriminate the two branches of points, and such discrimination is evaluated by the number of points in each quadrants as shown in FIG. 4.

Based on the Bayes-Dirichlet metric, we use a greedy search to obtain the optimal splitting boundary $E^*_j$ for the parameter $x_j$:

$$E^*_j = \mathrm{argmax}_{E_j \in x_j} Diff(E_j). \quad (5)$$

The distribution difference of $x_i$ due to the split in $x_j$ is represented as $G(x_j) = Diff(E^*_j)$. We use $G(x_j)$ to measure the influence of the candidate $x_j$ over the target variable $x_i$. Large $G(x_j)$ values indicate strong dependencies between two variables. Based on the influence metric $G(x_j)$, we employ a top-down, greedy strategy to build a dependency tree for the target variable $x_i$. That is, we compute the influence measure $G(\cdot)$ for all candidates and select the one with the largest influence as the parent of $x_i$.

Accordingly the samples are divided into two branches based on the splitting boundary in the parent parameter. Since the target $x_i$ may have multiple parents, we repeat the parent search in each branch of the samples. Such recursion stops when all the remaining variables have the influence $G(\cdot)$ less than a predefined threshold.

Figure 5:
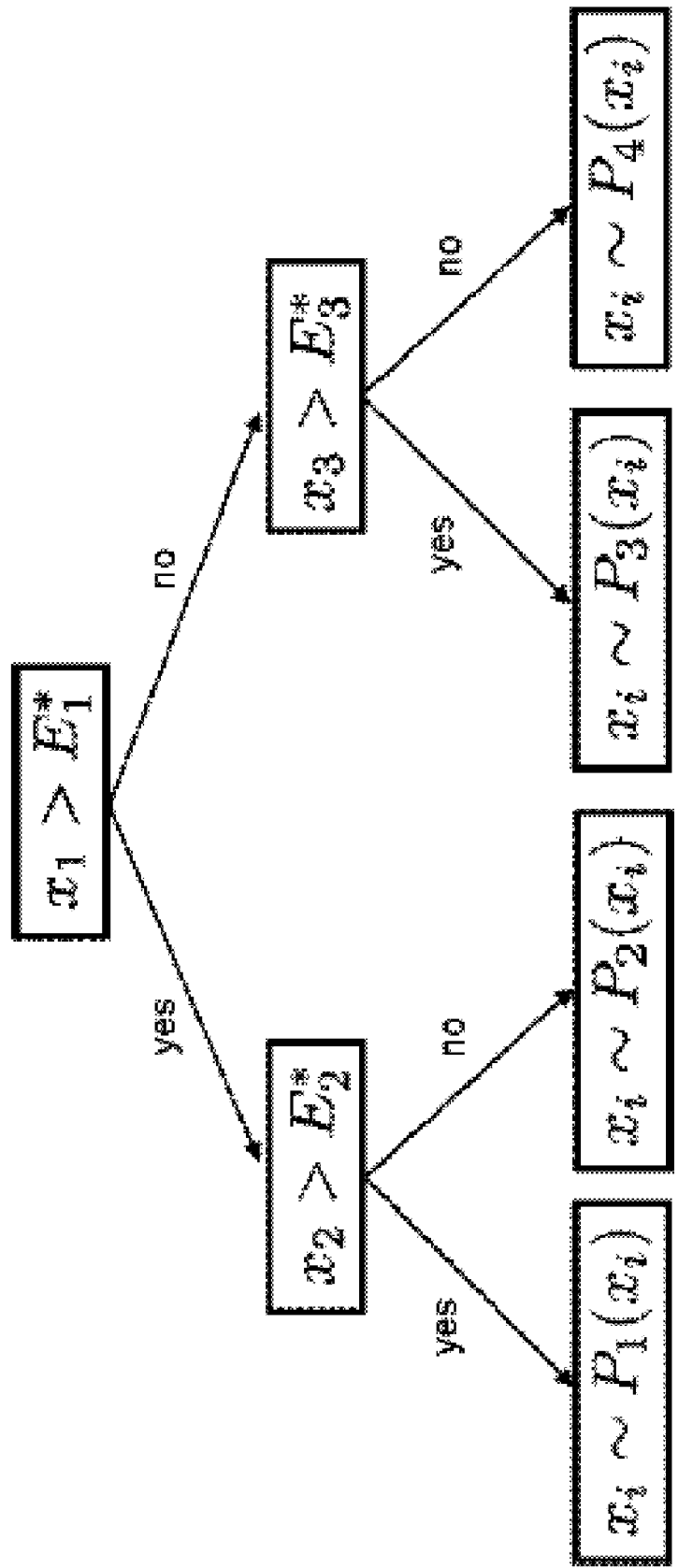
FIG. 5 is a schematic block diagram showing local dependency tree for a variable $x_i$.

FIG. 5 illustrates the learned dependency tree for the target variable $x_i$, in which three parents, $x_1$, $x_2$, and $x_3$ have been discovered. The variable $x_1$ is identified first as the most influential variable for $x_i$. The data points are divided into two parts based on the point $E^*_1$ in $x_1$. In each branch of the divided samples, we identify $x_2$ and $x_3$ as the second level parents respectively. The leaf nodes represent the data distribution of $x_i$ given different parent values. For example, the leftmost leaf represents the distribution of $x_i$ with conditions $x_1 > E^*_1$ and $x_2 > E^*_2$. Note that the dependency tree for each variable $x_i$ only represents the local structure of the Bayesian network. After we discover the dependency trees for all variables, the whole network can be built up by combining those local structures together. The parents of each variable $x_i$, $Pa_i$, in the Bayesian network are the set of variables on which there exists a split in the dependency tree for $x_i$. For instance, FIG. 5 reveals that the distribution of $x_i$ is affected by variables $x_1$, $x_2$, and $x_3$, and is independent of all other variables. Therefore, $x_1$, $x_2$, and $x_3$ are the parents of $x_i$ in the underlying network structure.

Once we build the network structure, the subsequent step is to model the joint distribution $P(x_1, x_2, \ldots, x_p)$ based on the learned variable dependencies. As shown in equation (2), the joint distribution is the product of a set of conditional distributions $P(x_i|Pa_i)$. Therefore, as long as we can correctly model those conditional distributions, the whole joint distribution can be easily computed. The conditional distribution $P(x_i|Pa_i)$ follows the learned dependency tree structure of $x_i$, which divides the whole data set into a number of subsets.

Each leaf node in the tree represents one subset of samples located in a region generated by certain partitions of its parents. As a result, the conditional distribution $P(x_i|Pa_i)$ is described by multiple expressions, each of which represents the $x_i$ distribution in one specific leaf node. For example, in FIG. 5 the data points are divided into four different regions and the conditional distribution $P(x_i|Pa_i)$ is then represented as $$P(x_i | Pa_i) = \begin{cases} P_1(x_i) & \text{if } x_1 > E^*_1 \text{ and } x_2 > E^*_2 \\ P_2(x_i) & \text{if } x_1 > E^*_1 \text{ and } x_2 \leq E^*_2 \\ P_3(x_i) & \text{if } x_1 \leq E^*_1 \text{ and } x_3 > E^*_3 \\ P_4(x_i) & \text{if } x_1 \leq E^*_1 \text{ and } x_3 \leq E^*_3 \end{cases} \quad (6)$$

in which $P_k(x_i)$, $k=1, \ldots, 4$, represents the $x_i$ distribution for those data in the k th leaf node. There has been a number of methods to model $P_k(x_i)$ such as the linear Gaussian model and the mixture of Gaussians. Here we use the non-parametric kernel density estimation, a well-known technique in statistics and pattern recognition fields, to model the distribution of $x_i$ in each partitioned region because the kernel density estimation does not rely on any assumptions about the data distribution shapes or the number of distribution mixtures.

Unlike parametric models which require a nontrivial amount of data to learn the accurate distribution, the kernel density estimation can generate smooth and continuous distribution estimation even with a small number of samples. Let $x_i^{(1)}, x_i^{(2)}, \ldots, x_i^{(M)}$ be all the measurements of $x_i$ from data points located in the k th leaf region, the kernel density estimation of the distribution $P_k(x_i)$ is obtained based on a kernel function $K(u)$ and a bandwidth $\sigma$ as $$P_k(x_i) = \frac{1}{M\sigma} \sum_{m=1}^{M} K\left(\frac{x_i - x_i^{(m)}}{\sigma}\right). \tag{7}$$

A common choice of the kernel $K(\cdot)$ is the Gaussian function with zero mean and unit variance. The bandwidth parameter $\sigma$ in equation (7) determines the smoothness of the estimated distribution. Here we choose $\sigma$ as the median of all distances between $x_i^{(m)}$ and its nearest neighbor. For details about the kernel density estimation and bandwidth selection.

Since the Bayesian network encodes the joint distribution $P(x_1, x_2, \ldots, x_p)$ of configuration parameters, it can be used to guide the new configuration sample generation. We want more samples to be generated around the peak position of the estimated distribution and fewer samples in low density regions. Since the joint distribution is expressed in a factorized fashion described in equation (2), the value of the new sample is generated in an ordered way with one variable at a time. That is, a variable has to be sampled after all its parents have already been sampled. In order to do that, we first order the variables based on the network topology such that the ancestors of the variable $x_i$ must be sampled before $x_i$. The sample value generation is then performed iteratively through the variables. In each iteration, the value of the variable whose parents are already fixed is generated using the corresponding probability $P(x_i|Pa_i)$. The generation of the new $x_i$ value based on such conditional probability is easy because $P(x_i|Pa_i)$ is a summation of Gaussian functions as described in equation (7). After the values of all variables have been generated, we obtain an instance of the new configuration sample.

FIG. 6 is a pseudocode listing that briefly describes the general procedures of Bayesian network guided configuration tuning. For simplicity, we use $BN_g$ to represent the Bayesian network learned at the g th sample generation. Since we have no idea about the parameter dependencies at the beginning, the uniform random sampling is used to create $\rho$ samples as the initial population. Note that the joint probability $P(x_i, \ldots, x_p)$ modeled by the Bayesian network should reflect the underlying performance function $f(x_1, \ldots, x_p)$ described in equation (1). That is, the probability must be high in regions with good performance evaluations and low in other areas in the configuration space.

In order to achieve this, we select $\mu$ samples ($\mu \leq \rho$) from the population based on their performance evaluations to construct the Bayesian network, rather than use all $\rho$ samples in the network construction. The configuration samples with high performance evaluations get high chances of selection. Once the Bayesian network $BN_{g-1}$ is constructed, we generate $\lambda$ new samples by sampling the network structure.

The g th population of samples are then obtained by applying recombination and mutation operators on the $\lambda$ new samples as well as the old ones. While the goal of recombination is to share the information from previous populations so that the prior knowledge about the structure of search space can be preserved, the mutation operator adds some randomness into the new population so that the search process can have more chances to explore new structures in the search space. After we evaluate the samples in the g th population, we select $\mu$ samples from the population again to construct Bayesian network $BN_g$ for the next generation.

Note that the g th population of samples usually has better performance evaluations than previous populations because they are sampled from the latest Bayesian network that captures optimal regions in the configuration space. In addition, the update of the Bayesian network will lead to a more accurate description of optimal regions in the configuration space, which in consequence produces samples with even better performances. Such iterative sample generation and network learning processes follow the strategies of evolutionary search, which will eventually converge to the optimal point in the configuration space.

The convergence speed of the algorithm and the final discovered optimal point depend on the selection of three algorithm parameters, $\rho$, $\mu$, and $\lambda$. A small population size $\rho$ implies faster convergence of the algorithm, but does not guarantee a global optimal point. If we know the complexity of objective function, we can determine the parameter values based on such knowledge, i.e., choose small $\rho$ values for simple functions whereas large $\rho$ values for sophisticated problems. Unfortunately, for our purposes herein, we do not have such prior knowledge. Our selection of parameters is based on conditions in which the population size $\rho = 20$ and the parameters $\mu$, $\lambda$ are proportional to the population size $\mu = \lambda = \rho/2$.

It is important to note that the overhead of learning the Bayesian network is neglected in the configuration tuning compared with the time spent in evaluating each configuration sample. Through the Bayesian network guided tuning, we can discover the best configuration setting in system $S_0$. More importantly, we also obtain a Bayesian network as the byproduct of tuning process. Such network describes the dependencies of system configurations, which represent valuable experiences of configuration tuning in $S_0$. Accordingly, we will utilize those experiences to speed up the configuration tuning in another system $S_1$.

Once we obtain the Bayesian network from system $S_0$, it can be utilized to benefit the configuration tuning in system $S_1$. We employ the algorithm described in FIG. 6 to conduct the optimal configuration search in system $S_1$. However, rather than starting with the uniform random sampling to generate the initial sample population, we use the learned Bayesian network from $S_0$ to generate initial samples and build the initial network $BN_0$ for system $S_1$. With the help of such transferred experiences, the generated initial samples in $S_1$ will be located more closely to the optimal area in the new configuration space than the uniformly generated samples. Furthermore, since the transferred Bayesian network records the dependencies of configuration parameters, a lot of unnecessary efforts for exploring the system configuration space can be avoided. As a result, the convergence speed of the configuration search in system $S_1$ can be significantly accelerated.

While the Bayesian network provides valuable experiences and is easy to be embedded into the configuration tuning in $S_1$, it does not mean that all the transferred parameter dependencies are useful and that the system $S_1$ can discover its optimal configuration in an instant. The convergence speed of configuration search in $S_1$ depends on the similarities of the two systems $S_0$ and $S_1$. If $S_0$ and $S_1$ are almost identical, then $S_1$ can very quickly identify its optimal configuration with the help of the transferred Bayesian network because all parameter dependencies represented by the network stay the same in system $S_1$.

In practice, however, the systems $S_0$ and $S_1$ are allowed to have differences such as hardware configuration disparities, software version differences, and some topology variations. In those situations, not all the configuration dependencies learned from $S_0$ remain valid in system $S_1$. The algorithm has to adapt to those dependency variations in the configuration tuning in $S_1$. Such adjustment can be made very efficiently in the Bayesian network based configuration tuning because of the advantage of Bayesian network structure: each node in the network is conditionally independent from its non-descendents given its parents. That is, the Bayesian network only modifies the local parts of the network that are related to dependency variations and keeps the major portion of the network unchanged.

For example, if we add more memories into the system $S_0$ to upgrade it into a new system $S_1$, the Bayesian network will only focus on the relearning of those dependencies with memory related nodes, rather than relearning the whole structure again. Such local modification is much faster than total network construction. Therefore, the transferred Bayesian network is very helpful to improve the efficiency of configuration tuning in system $S_1$.

Figure 7:
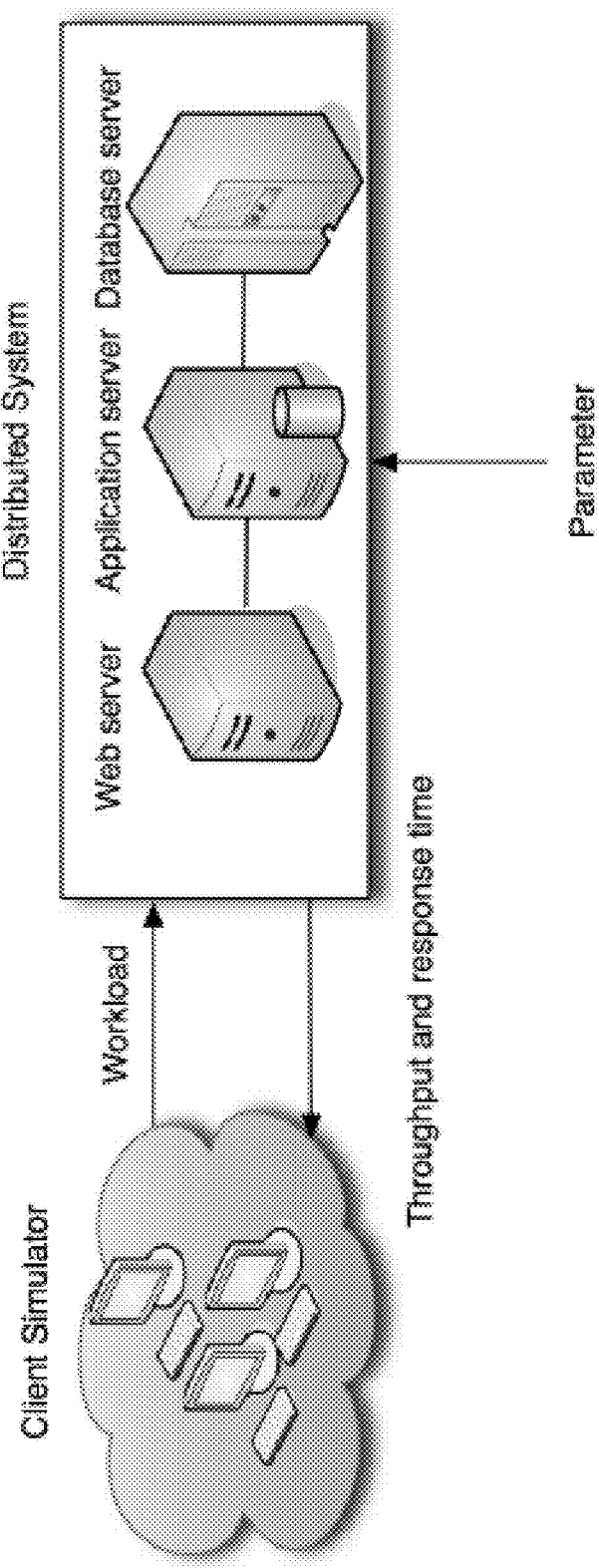
FIG. 7 is a schematic block diagram showing an architecture for a test bed system.

We built a test bed system based on J2EE multi-tiered architecture to test our approach. As shown in FIG. 7, we use Apache as the web server. The application server comprises a web container (Tomcat) and the EJB container (JBoss). The MySQL is running at the back end to provide persistent storage of data.

PetStore 1.3.2 is deployed as our test bed application to simulate an online store for selling pets as products. Its functionality comprises a store front, shopping cart, purchase tracking, and so on. We build a client emulator to generate a workload similar to that created by typical user behaviors. The emulator produces a varying number of concurrent client connections with each client simulating a session based on some common scenarios, which consists of a series of requests such as creating new accounts, searching by keywords, browsing for item details, updating user profiles, placing orders, and checking out.

As may be readily appreciated, there are a large number of configuration parameters distributed across multiple tiers in the system. For example, in the Apache configuration file 'httpd.conf', there are more than 240 uncomment lines that specify different service modules and parameter settings. The JBoss main configuration file 'jboss-service.xml' contains more than 70 attribute nodes to describe its parameters. In our experiment, we first filter out irrelevant parameters and select only those that are important to the system performance, which are listed in Table 1.

The prefix of parameter name ('W.', 'A.', or 'D.') denotes that the parameter comes from the web tier, application server or database tier. The minimum/maximum values of those configurations as well as their default settings are also presented in that table.

Before tuning those configuration parameters however, we first define a metric to describe the system performance. In many web based systems, the service provider always desires the system to have as high a throughput as possible to maximize its revenue. Meanwhile the system also has to provide certain guarantees on the request response time in order to attract more users. Therefore, our performance metric considers the measures of both request response time T and throughput X.

We use the following utility functions to describe their contributions to the system performance respectively:

$$U_1(T) = \frac{1 + e^{-\alpha\beta}}{1 + e^{\alpha(T-\beta)}} \quad (8)$$

and $$U_2(X) = \frac{X}{X_{max}} \quad (9)$$

where the parameters $\alpha$ and $\beta$ in the function $U_1(T)$ have values $\alpha=0.01$ and $\beta=100$ ms, and $X_{max}=500$ requests/sec is the predefined maximum throughput in the function $U_2(X)$.

We can see that while the utility function $U_1(T)$ monotonically decreases with the increase of request response time, the utility of throughput linearly increases with the value of throughput. We choose a nonlinear utility function for request response time because we want to simulate the sensitivity of user satisfactions in accessing the system. We observe that when the request response time is within certain range, a slight change of its value is critical to the user satisfaction, which in turn causes dramatic changes of utility values. However, when the response time is out of that range, e.g., longer than 10 seconds, slight variations do not affect the user satisfaction too much. In terms of the system throughput, we expect its value to be proportional to the business revenue. Therefore, we use the linear function in equation (9) to represent its utility.

During the configuration sample evaluation, given N completed requests with response times $\{T_1, T_2, \ldots, T_N\}$, we use the average of utilities $$\frac{1}{N}\sum_{i=1}^{N} U_1(T_i)$$

to describe the contribution of response time to the system performance. Similarly, we divide the sample evaluation period into M intervals and collect the throughput in each interval, which results in M throughput measurements $\{X_1, X_2, \ldots, X_M\}$. The performance in terms of throughput is represented by the average utilities on those throughputs $$\frac{1}{M}\sum_{j=1}^{M} U_2(X_j).$$

As a whole, the system performance is characterized as the composition of two utilities $$U = \eta\left\{\frac{1}{N}\sum_{i=1}^{N} U_1(T_i) + \frac{1}{M}\sum_{j=1}^{N} U_2(X_j)\right\} \quad (10)$$

where U is called the overall system utility and the parameter $\eta$ is a normalization constant with $\eta=10$. Note our definition of utility function and its parameter setting is independent of the configuration tuning techniques because those algorithms only consider relative performances among configuration samples.

We use the Bayesian network based tuning algorithm to discover the optimal configuration of test bed system. For each sample, we generate certain workloads to the system and measure the system performance under that specific configuration setting. The input workloads are represented by the number of concurrent users visiting the system. In our experiment, we generate an initial number of concurrent users at the beginning, then add more users gradually until the system reaches its maximum capacity. The system operates in that high workload situation for a while, and then gradually decreases the users until all users leave the system. Note that it is important to evaluate the configuration sample under high workloads because typically in that situation the system performance will vary greatly for different settings. In the whole evaluation period, the system warm-up and cool-down occupy around 8 minutes, and the operation under high workloads takes more than 10 minutes. Since the evaluation of one single sample takes around 20 minutes, it is necessary to come up with efficient solutions that can identify the optimal setting with minimal number of sample evaluations.

In order to test the effectiveness of our proposed experience transfer in improving the configuration tuning efficiency, we take the following procedures to conduct the experiments. We treat the test bed in FIG. 7 as the original system $S_0$ and apply the Bayesian network based optimization to discover its optimal configurations. We then upgrade the system $S_0$ by the three different scenarios shown in FIG. 8. The proposed system upgrades include the hardware upgrade, the software version change, and the node addition, all of which reflect common situations of system evolution in real environment.

For each upgraded system, the learned Bayesian network from $S_0$ is used as transferred experiences to help the configuration search. We will show that the tuning processes in three upgraded systems are all significantly accelerated with the help of transferred experiences. Following such experimental design, we first describe the configuration tuning in system $S_0$. Then we present the tuning results in each upgraded system in the following three sections respectively. The summary and discussions follow.

We treat the test bed in FIG. 7 as the original system $S_0$ and use the Bayesian network based algorithm to search its configuration setting that can bring the highest utility expressed in equation (10). During the configuration search, we set the maximum number of sample evaluations as 150.

Figure 9A:
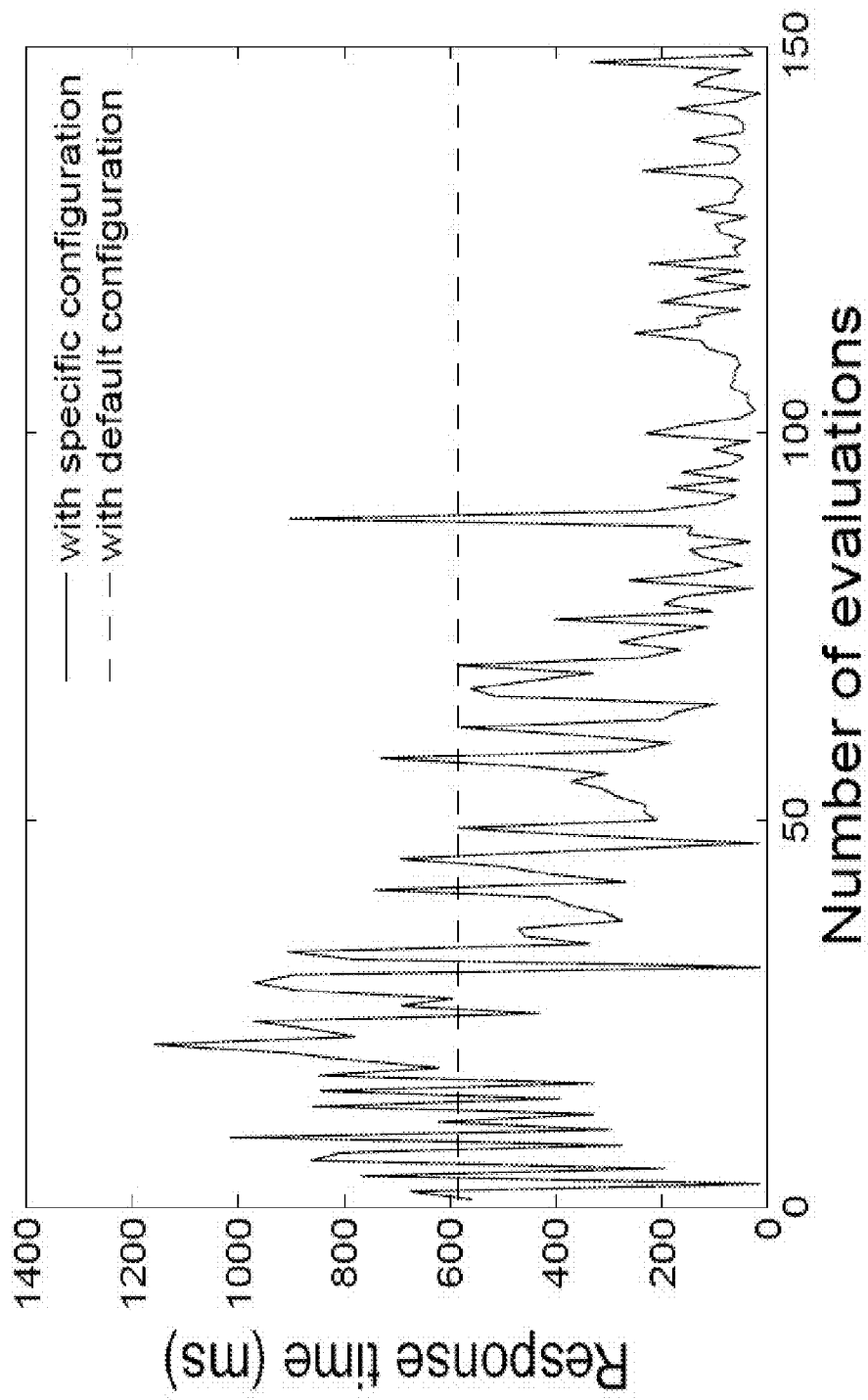
FIGS. 9(a), 9(b) and 9(c) are a series of graphs showing results of tuning the original system: 9(a) response time; 9(b) throughput; and 9(c) utility.

FIG. 9 presents the generated response time, throughput, and the overall utility curves for each evaluated sample during the tuning process. We can see clear improvements of system performance as more samples are evaluated. In terms of the request response time, as shown in FIG. 9(a), it stays at high values for the first 30 samples and then gradually decreases. After the 100th sample, most of the response times are kept at very low values with only a few jumps due to the randomness of the algorithm.

Figure 9B:
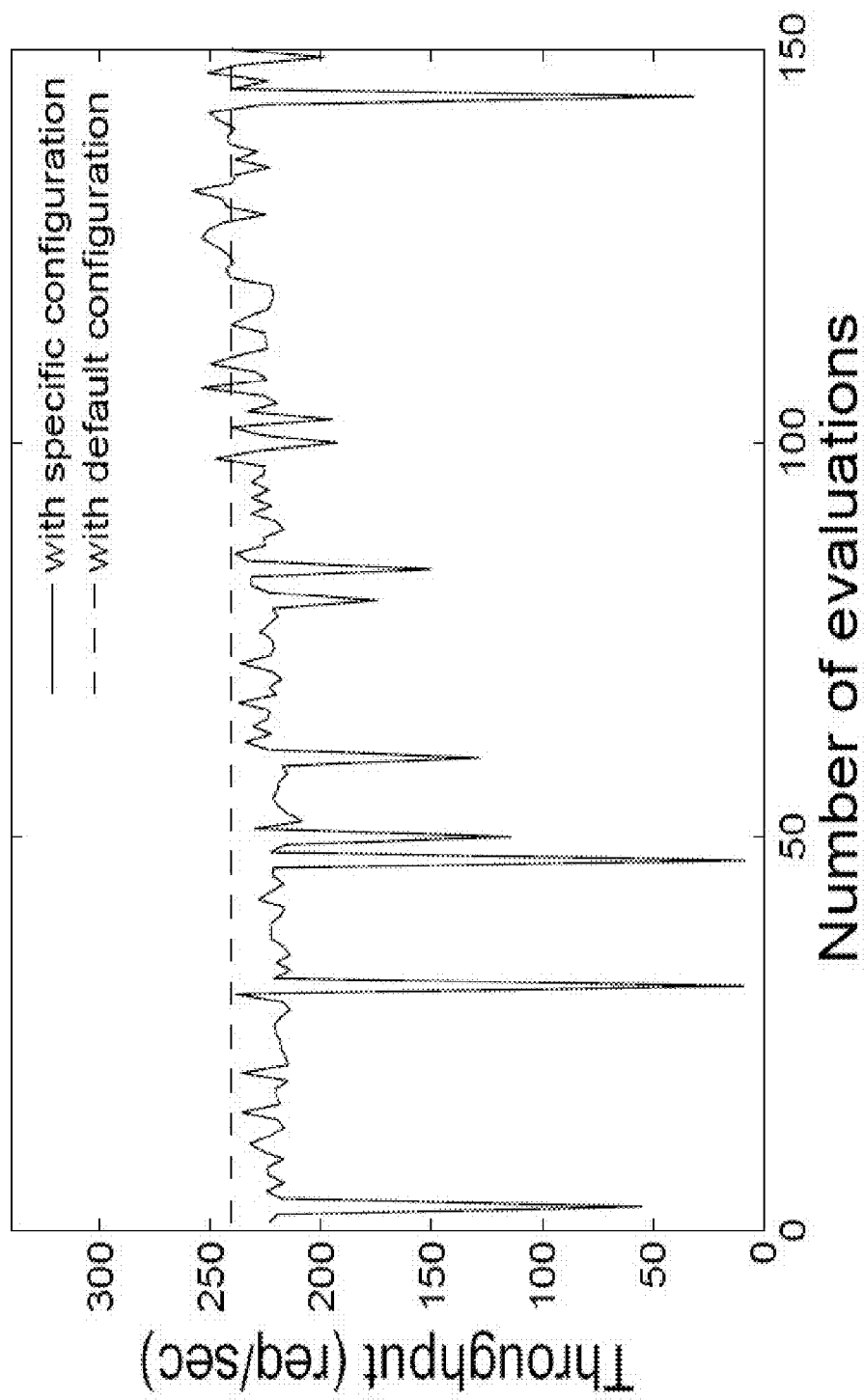

While the system throughput curve does not exhibit such drastic changes, the evidences of improvement are also clear as shown in FIG. 9(b). At the beginning of the search, the system throughputs are mainly kept around the value 220 requests/sec. It then gradually increases as more samples are generated.

Figure 9C:
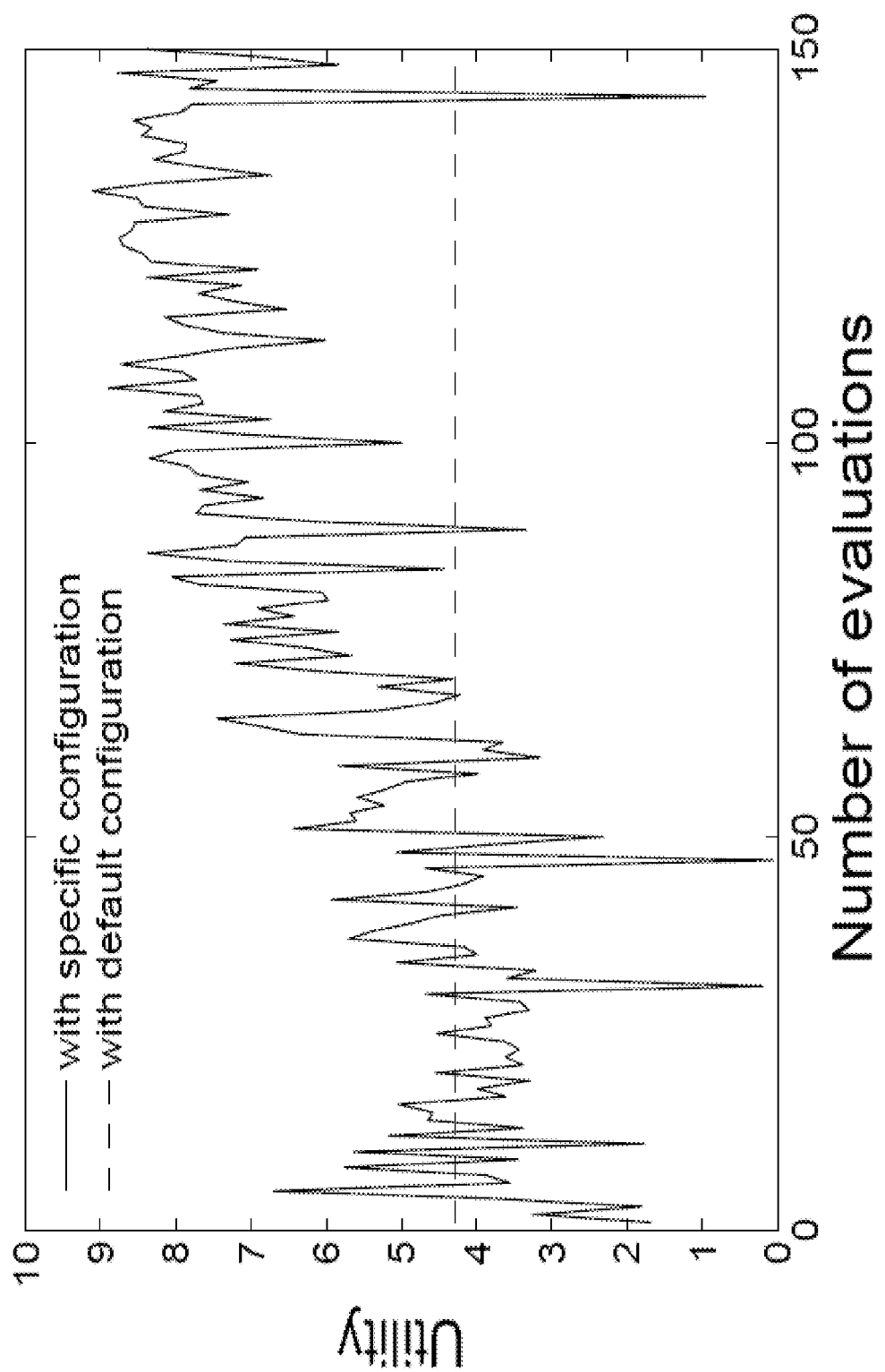

As a result, the overall system utility curve, plotted in FIG. 9(c), shows an obvious increase during the configuration search. While all the utilities for the first 50 samples vary between 0 and 7, the utilities for the last 50 samples are mostly ranged from 7 to 9. The maximum utility is identified at the 132nd sample with the value 9.11, which corresponds to the response time 47.0 ms and throughput 258.4 requests/sec. The dashed lines in FIG. 9 represent the performance of system default configuration. It brings the request response time 585.3 ms, throughput 240.6 requests/sec, and the overall utility 4.28, which is much worse than that obtained by the Bayesian network based method.

We also compare our Bayesian network based approach with other configuration tuning methods such as the recursive random sampling (RRS) and the covariance matrix adaptation (CMA). For each algorithm, we limit the number of sample evaluations within 150.

Table 2 lists the values of request response time, system throughput, and the utility of the best settings identified by those algorithms. It also presents the performance of system default configuration. Compared with the default setting, the RRS algorithm achieves a much lower response time, 72.0 ms, and a relatively higher throughput, 246.1 requests/sec. However, since the RRS algorithm only relies on simple heuristics obtained from the local function estimation, its performance is poorer than those of distribution guided searches such as the CMA and our Bayesian network based algorithms. The CMA algorithm obtains the response time, 46.5 ms, and throughput, 255.9 requests/sec. While the Bayesian network based tuning produces comparable results with the CMA algorithm, with the response time, 47.0 ms, and throughput, 258.4 requests/sec, there is an additional advantage of our method that is preferable in the experience transfer. That is, rather than using a single covariance matrix as in the CMA algorithm, the Bayesian network uses probability factorization to model the parameter distribution. Such factorized distribution is expressed in a network graph, which can be easily transferred between two systems.

Figure 10:
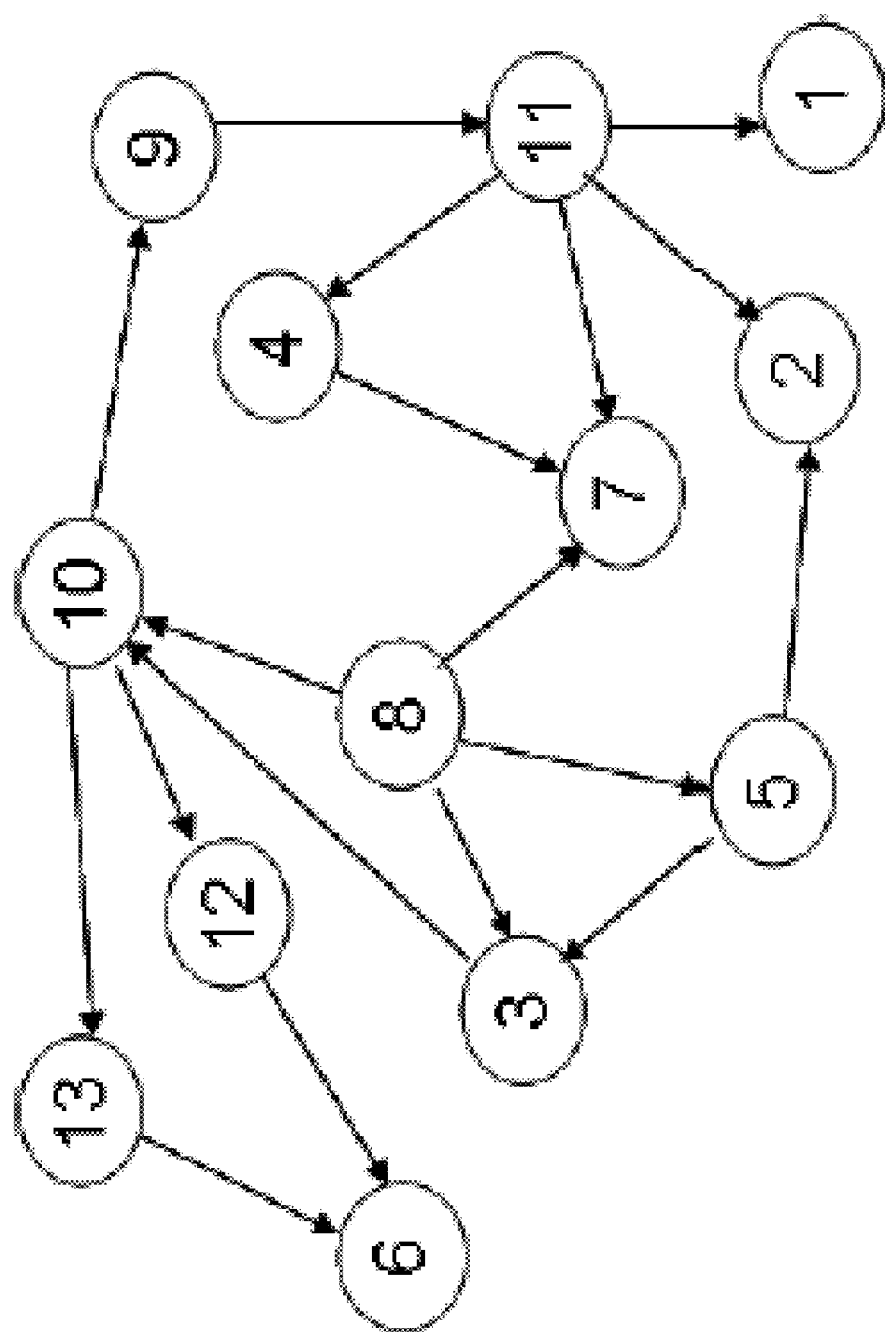
FIG. 10 is a schematic diagram showing the structure of the learned Bayesian network.
Figure 11A:
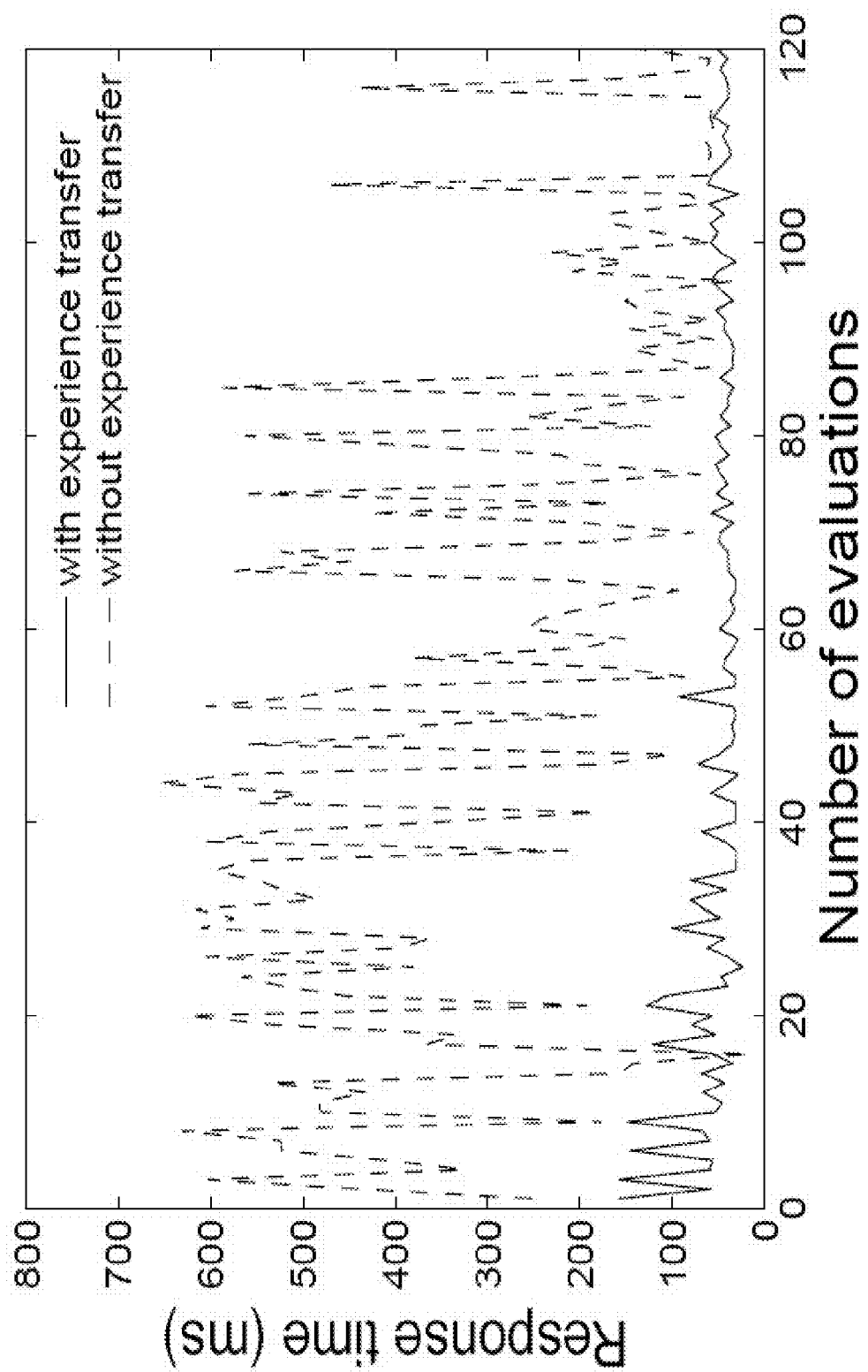
FIGS. 11(a), 11(b) and 11(c) are a series of graphs showing results of tuning the hardware upgraded system: 11(a) response time; 11(b) throughput; and 11(c) utility.
Figure 11B:
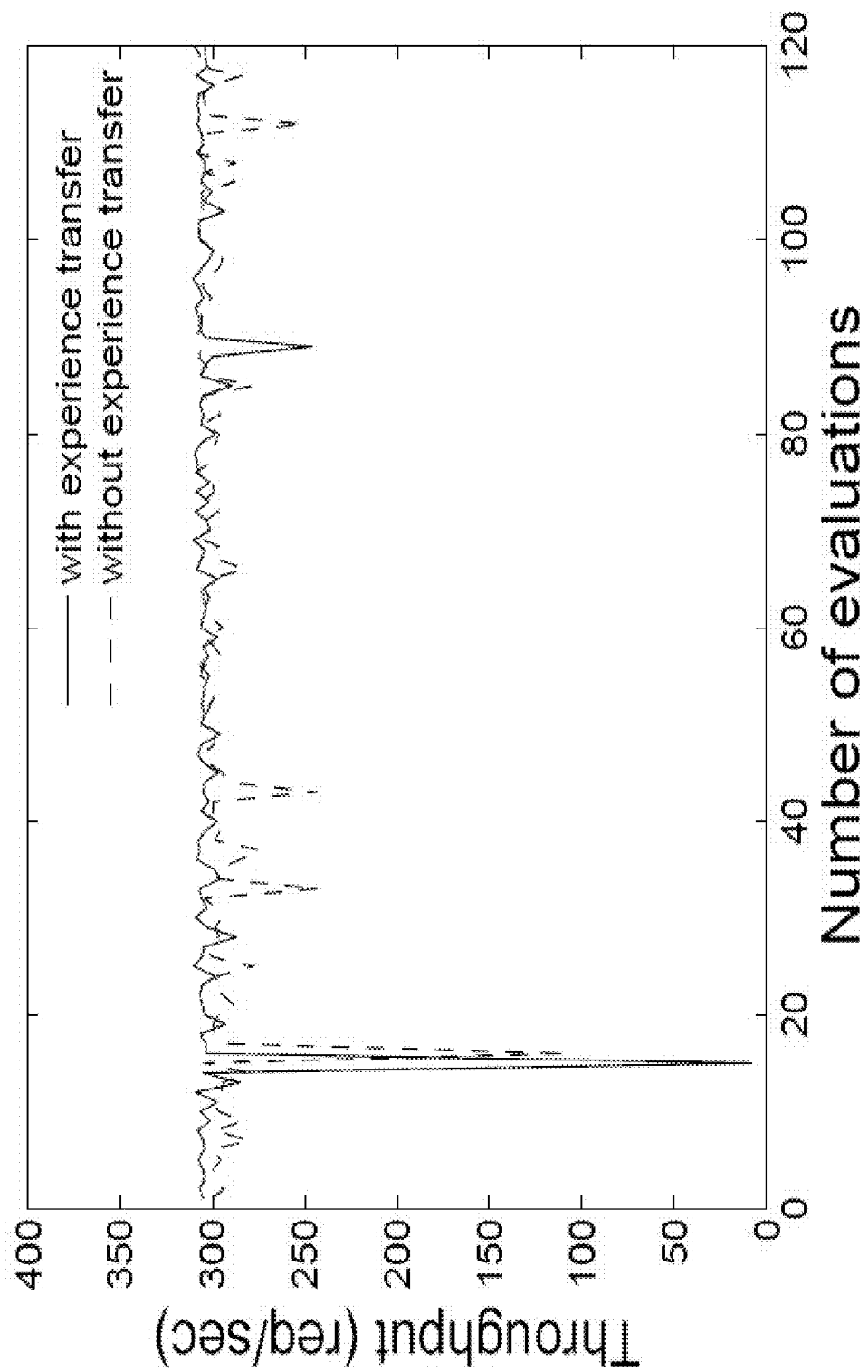
Figure 11C:
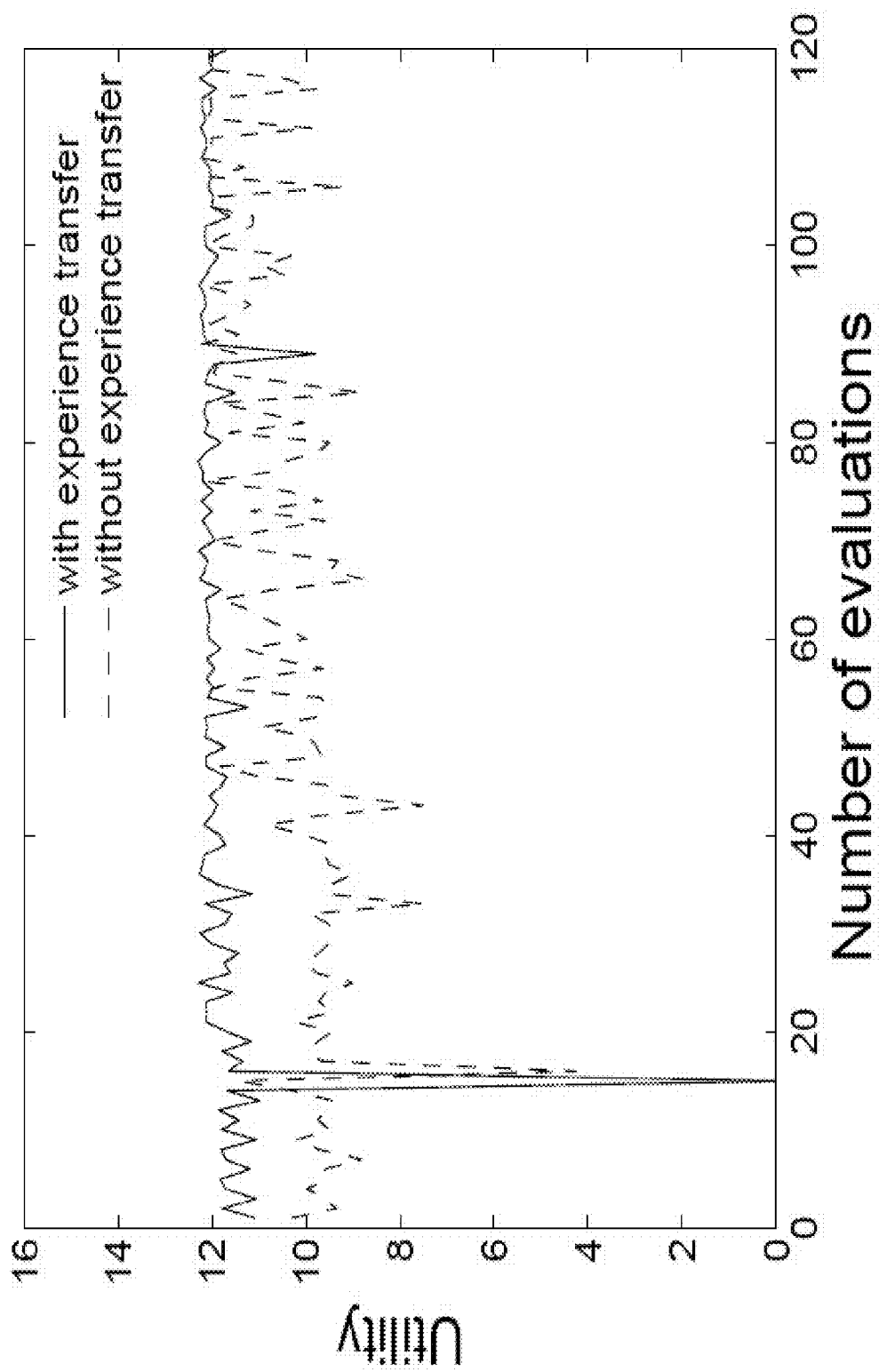

FIG. 10 presents the learned network graph that describes the dependencies among configuration parameters. The number in each node of the graph corresponds to the index of its represented configuration parameter described in Table 1. Here we do not plan to explain the dependency relationship for each parameter one by one. Instead we present the following observations from the learned Bayesian network:

The configuration dependencies exist among parameters not only in the same system tier but also across different tiers. For example, the size of database table cache D.TableCache (node 10) depends on the database parameter D.MaxConnections (node 8) as well as the parameter from the web server tier W.MaxClients (node 3).

There exists a close relationship among the parameters W.MaxClients (node 3), A.MaximumPoolSize (node 5) and D.MaxConnections (node 8). Those parameters determine the volume of user requests that can flow through the system. Their dependencies reveal that the setting of maximum clients in the web server should consider the maximum pool size in the application server as well as the maximum connections in the database server in order to not block user requests. If we increase one of those parameters while keeping the others unchanged, the client requests may encounter waiting at the server door for server threads or connections.

The timeout related parameters are closely related. For example, the parameter A.TransactionTimeout (node 7) is dependent on the parameter D.WaitTimeout (node 11) as well as A.KeepAliveTime (node 4). The parameter WRequestTimeout (node 1) is correlated with the parameter D.WaitTimeout (node 11).

The memory buffer related parameters are correlated. For instance, the parameter D.QueryCacheSize (node 13) is correlated with the parameter D. TableCache (node 10). The parameter A.MaximumQueueSize (node 6) is dependent upon the parameter D.QueryCacheSize (node 13) as well as D.MaxAllowedPacket (node 12).

The hardware upgrade is implemented by changing the physical server in the database tier. The database server in the original system $S_0$ is running on a machine with Intel Xeon CPU 3.4 GHZ and 1G memory. Now we upgrade it into a machine with Intel Quad Core CPU 2.4 GHZ and 2G memory. Other components of the system are unchanged.

We perform two configuration tuning processes in the upgraded system: the one without experience transfer which is called 'direct configuration search' and the one with experience transfer. In the experience guided tuning, the Bayesian network learned from the original system $S_0$ is used to generate the initial sample population as well as build the initial Bayesian network for the configuration search in $S_1$.

The performance results of both tuning processes are plotted in FIG. 10. We use dashed curves to represent the results produced by the direct configuration search, and solid curves to represent the results produced by the configuration search with experience transfer. As we can see, the convergence speed of configuration tuning without experience transfer is similar to that of the tuning process in the original system $S_0$, which requires at least 100 samples to reach the optimal region in the configuration space.

On the other hand, the configuration tuning with experience transfer produces much better results. FIG. 10(a) shows that the response times produced by the experience guided tuning are already very low at the beginning of the search, which means the transferred knowledge can quickly lead the sample generation towards optimal locations in the configuration space. While the search process needs some adaptations in the first 20 samples caused by the database hardware variations, such adjustment period is short.

The system throughputs produced by the experience guided search are also higher than those by the direct search for most of the samples. In terms of overall utility, we can see that the transferred experiences can help the configuration search to obtain the highest utility, 12.27, at the very early stage of the configuration search (the 25th sample), whereas the direct configuration search needs 109 sample evaluations to reach its optimum utility, 12.25. While the best utilities identified by two processes are almost the same, there are sharp differences in the time spent by two processes to reach the optimal utilities.

We further look into the learned Bayesian network in $S_1$ and compare it with the transferred Bayesian network from $S_0$. It shows that their network structures are almost the same, which means the dependencies discovered in system $S_0$ such as the one described in FIG. 10 still exist in the upgraded system. There are a few differences in the values of two network parameters, such as the splitting boundaries of parent variables in the dependency trees of some configurations. Those differences mostly appear in the dependency trees of database related configuration parameters, which coincides with the changes we made for upgrading the system.

We also compare the results of experience transfer with those by the 'point transfer' discussed earlier. In the point transfer, we record the optimal configuration identified in system $S_0$, and randomly generate 100 configuration samples in the neighborhood region of that setting. The neighborhood size for each parameter is defined as one-tenth of its value range, i.e., the range between the maximum and minimum values defined in Table 1.

We evaluate those samples in the upgraded system and select the one with the highest utility as the output of point transfer. Compared with the experience transfer that produces the response time, 38.7 ms, and throughput, 309.4 requests/sec, the point transfer brings a higher response time, 47.8 ms, and a lower throughput, 299.8 requests/sec. In terms of the overall utility, the point transfer generates a value 11.88, which is lower than the utility produced by our experience transfer mechanism.

However, since the overall utility is defined as the summation of average utilities of response time and system throughput, as described in equation (10), those mean values do not tell the evaluation variances for the comparison. In order to make a sincere illustration of performance improvement by the experience transfer over the point transfer, we use Student's t-test to reveal the significance of differences between the mean utilities produced by two transfer mechanisms. Such a statistical test is performed on the request response time and system throughput separately. For the request response time, we collect $N_p$ measured utilities during the evaluation of the best sample in point transfer, and $N_e$ utility values collected from the best sample evaluation in experience transfer. We compute the corresponding t value 2.80 and the degree of freedom 21992 for those two sample populations, which lead to the one-tailed significance p-value 0.0026. The p-value tells the probability that two sets of samples came from the same distribution. Its low value suggests the significant differences between the two utility means of response time. We use the same test to measure the significance of differences for system throughput, and obtain the p-value 0.0833. Based on those results, we conclude that our experience transfer can significantly enhance the configuration tuning performance compared with the point transfer mechanism.

While it is difficult for us to arbitrarily manipulate the real test bed to further highlight the better performance of our experience transfer over the point transfer, we believe our method will outperform the point transfer in most real situations, especially when the system undergoes partial but dramatic changes. For example, if a system change only moves the optimal setting of one parameter $x_i$ from a low value to an extremely high value, the point transfer cannot discover the new optimum in the upgraded system because such optimum is located far (in the $x_i$ axis) from the original setting. However, since the experience model contains the dependency knowledge of configuration parameters, our approach can quickly identify the path of the configuration search to discover the new optimum in the upgraded system.

It has been shown that different java virtual machines (JVM) in the application server will lead to different performances in web based systems. Therefore we change the Sun Microsystems Java Runtime Environment (JRE) version from 1.5.0 to 1.6.0 in the application server to realize the software upgrade from system $S_0$ to $S_1$.

The configuration tuning with and without experience transfer are performed in the upgraded system $S_1$. FIG. 12 plots the performance results of both processes. It shows again that the transferred experiences can significantly benefit the configuration search in the upgraded system whereas the direct search needs a lot of extra effort to identify the optimal configurations.

Figure 12A:
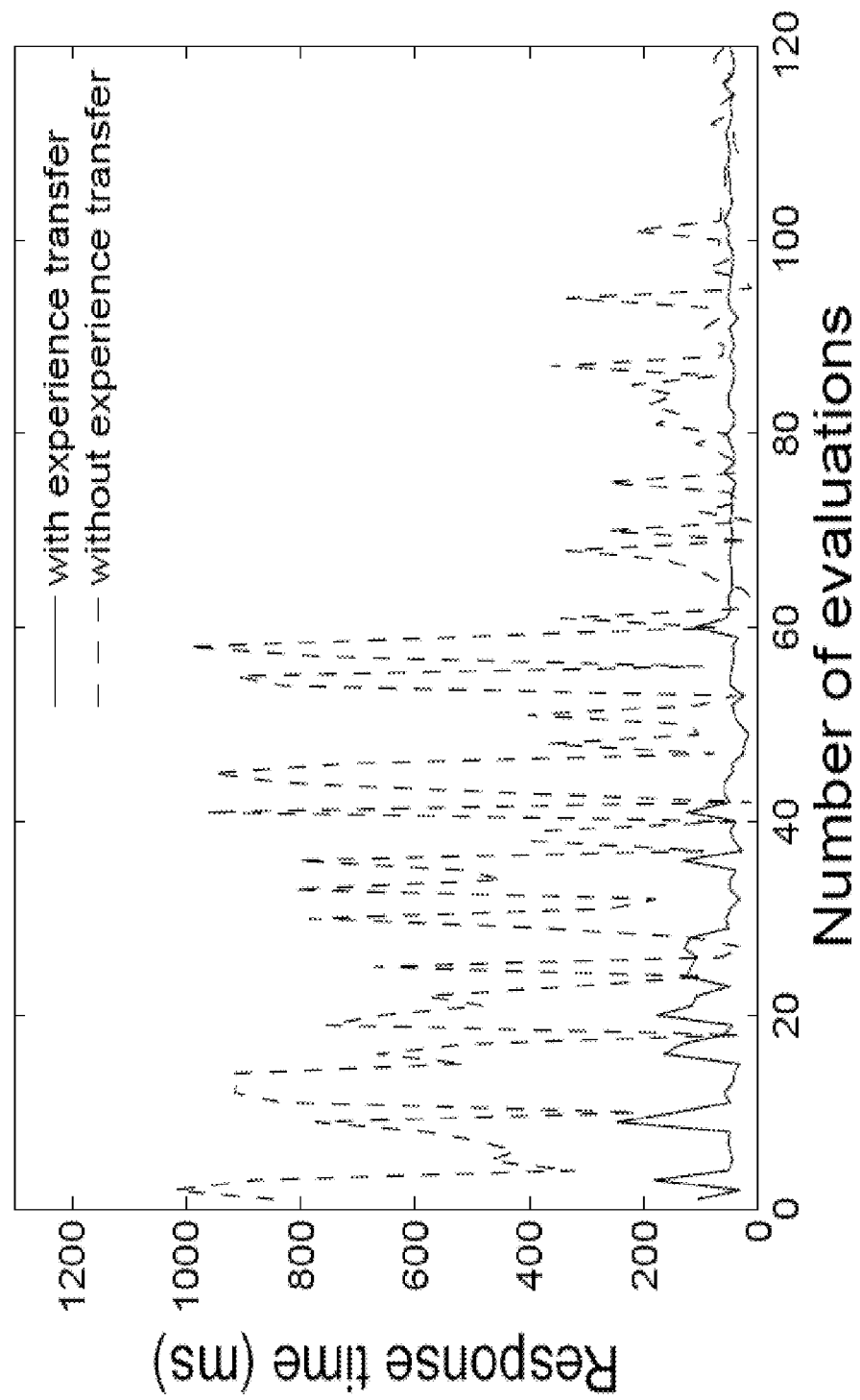
FIGS. 12(a), 12(b) and 12(c) are a series of graphs showing results of tuning the software upgraded system: 12(a) response time; 11(b) throughput; and 12(c) utility.

As plotted in FIG. 12(a), the response times produced by the direct search (the dashed curve) exhibit large variations in the first 60 configuration samples because the search process has no knowledge about the location of optimal configuration at the beginning of the search. In contrast, most of the samples generated by the experience guided search produce response times less than 200 ms (the solid curve).

Figure 12B:
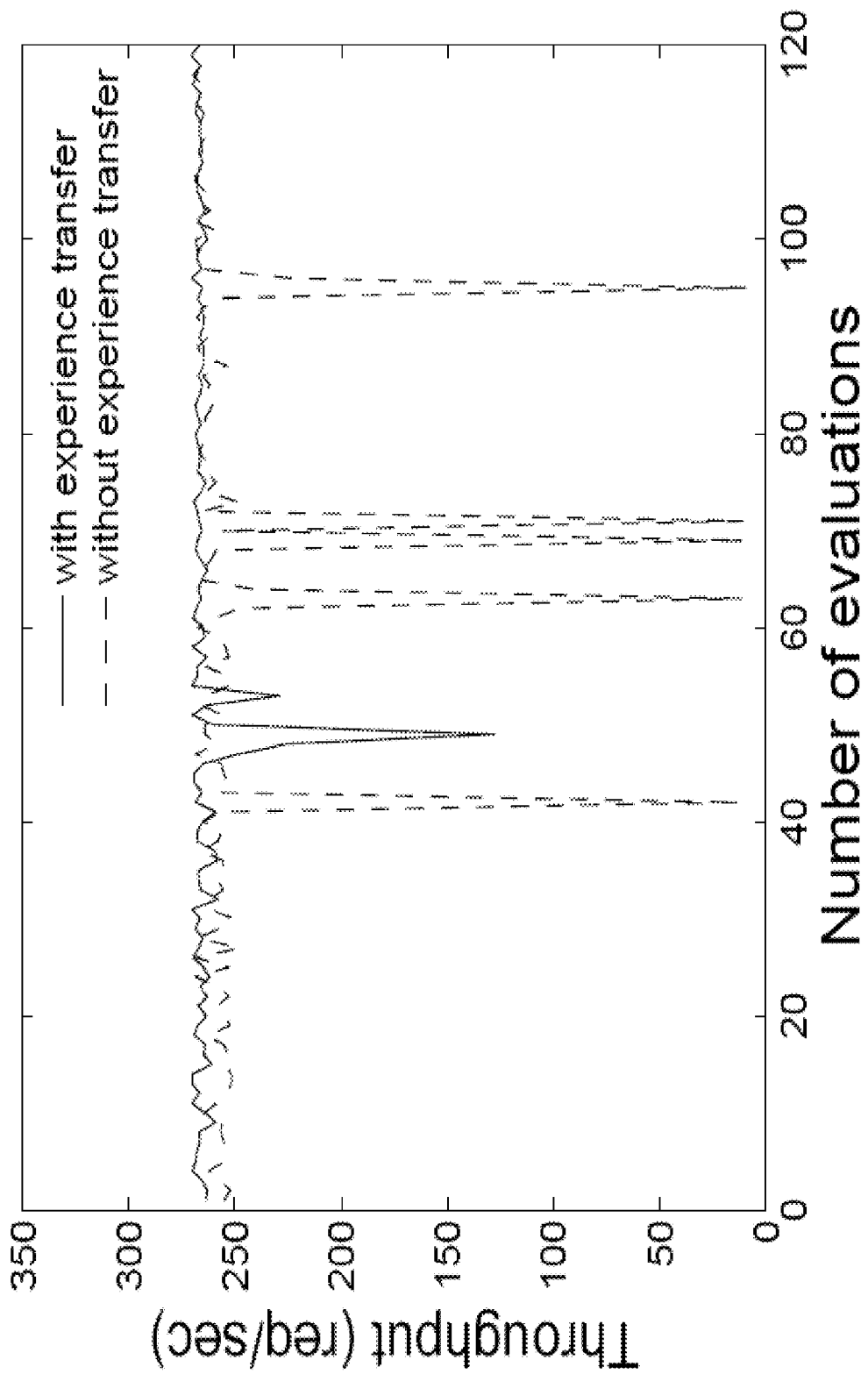
Figure 12C:
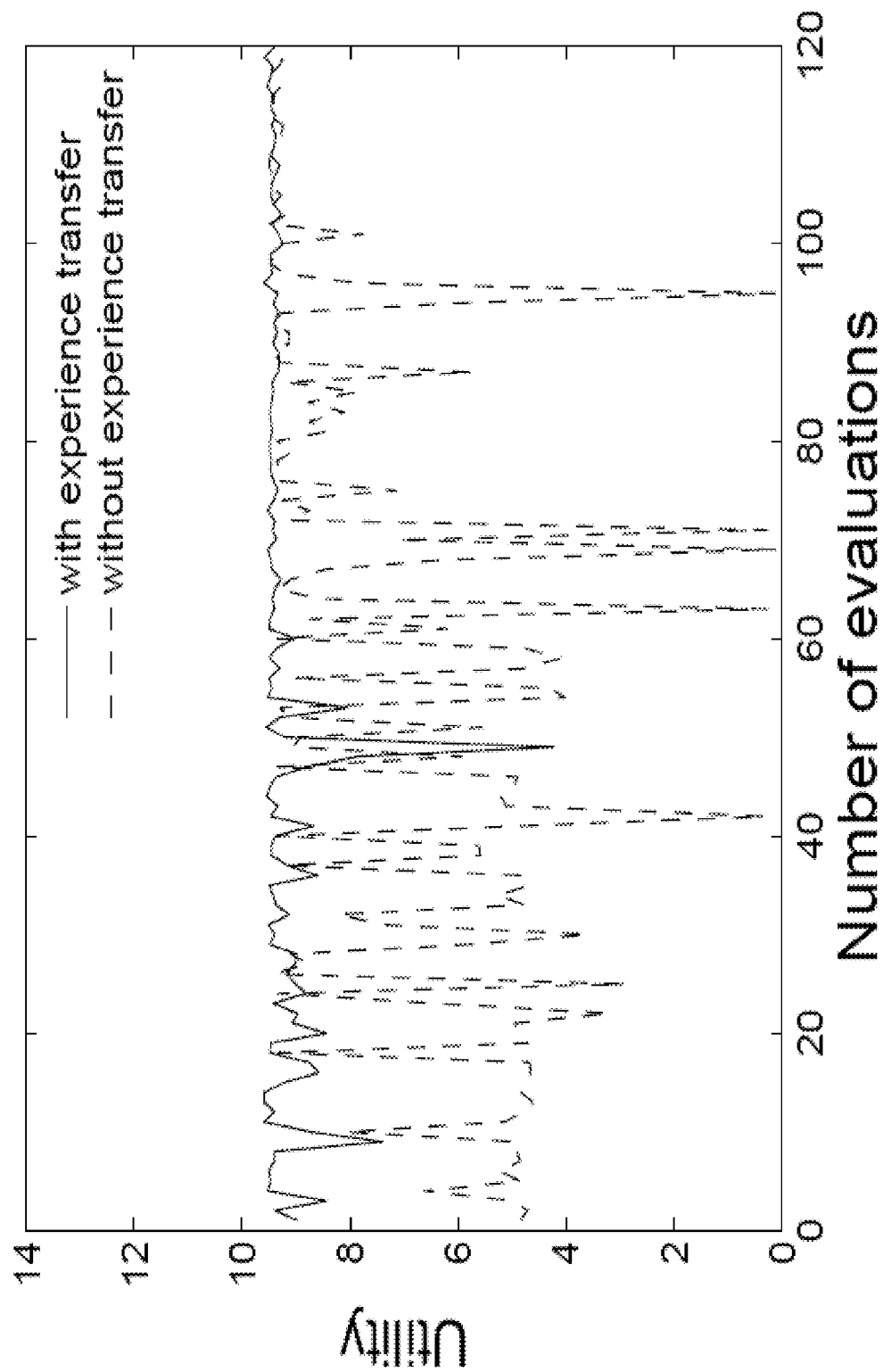

The throughput curves in FIG. 12(b) also show similar behaviors although the throughput differences between two processes are not as strong as those in the response time. In terms of the overall utility, we can see that it takes the direct search 117 sample evaluations to reach the best utility 9.52 while the experience guided search only uses 11 sample evaluations to obtain a slightly better utility, 9.58.

Note that there are some random peaks of utility values in the early stage of the direct configuration search, such as those at the 11th, 17th, and 26th evaluations. However, the utilities of those peaks are all below 9.35. While we can use one of those peaks as the solution of direct search to save the number of sample evaluations, such a result is inferior to the output of experience transfer, which can be easily verified by using the statistical test previously described.

Compared with the best utility, 9.1, obtained in the original system $S_0$, the configuration searches in the software upgraded system can achieve utilities higher than 9.5. This confirms that the JVM version change in the application server does improve the system performance.

We also compare the two Bayesian networks learned in systems $S_0$ and $S_1$. It shows that they share the same network structure with only slight differences in the values of some network parameters, especially for those in the local dependency trees of some application server related configurations. But such differences are so small that the experience guided tuning has not shown clear adjustment behaviors in FIG. 12 at the beginning of search process.

Figure 8:
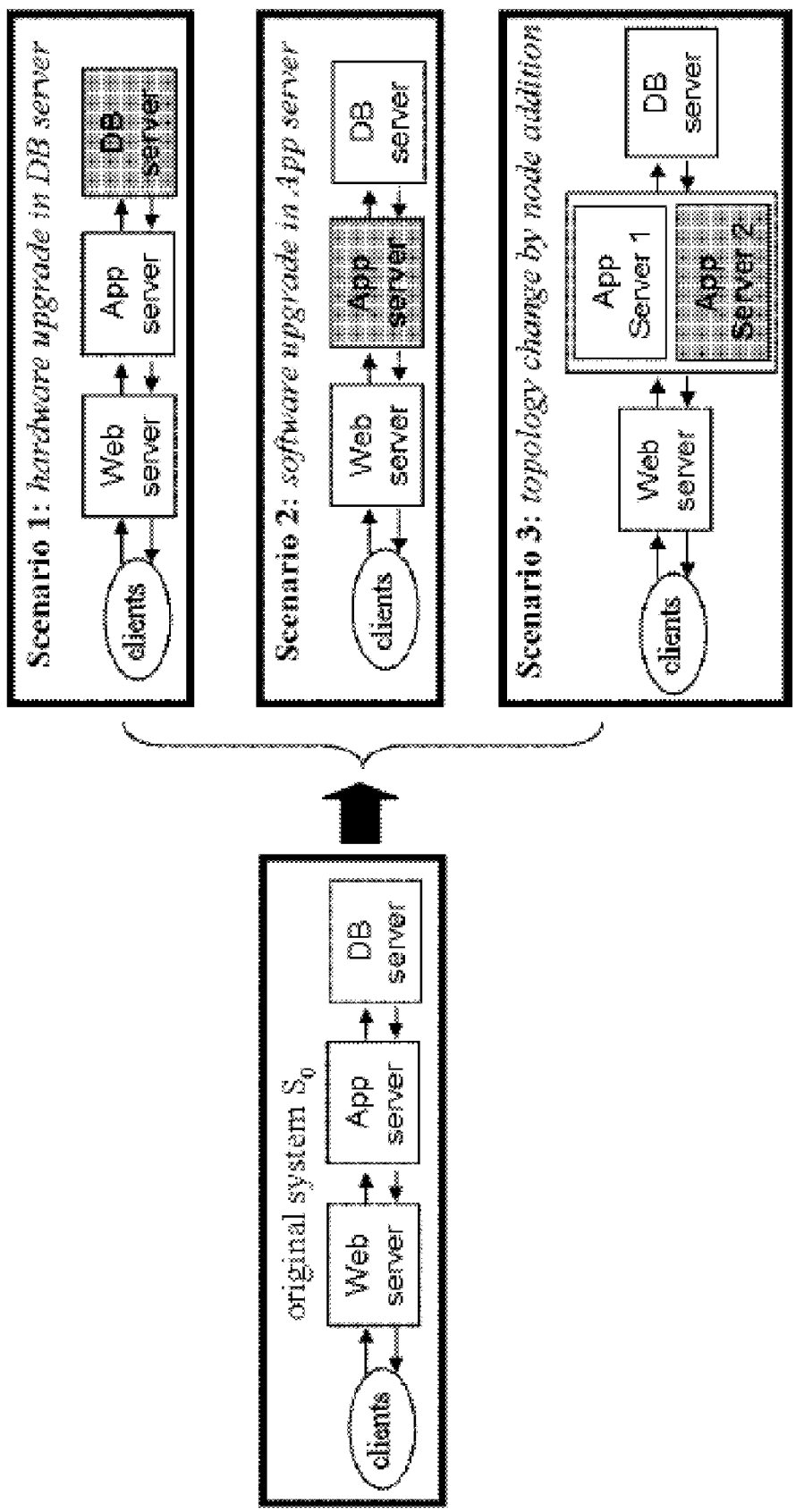
FIG. 8 is a schematic block diagram showing three scenarios for upgrading the system.

We implement the system topology change by adding another physical server in the application tier, described as scenario 3 in FIG. 8. Since the system capacity is expected to increase in this case, we raise the maximum number of concurrent users in the input workload to make the system fully loaded.

Figure 13B:
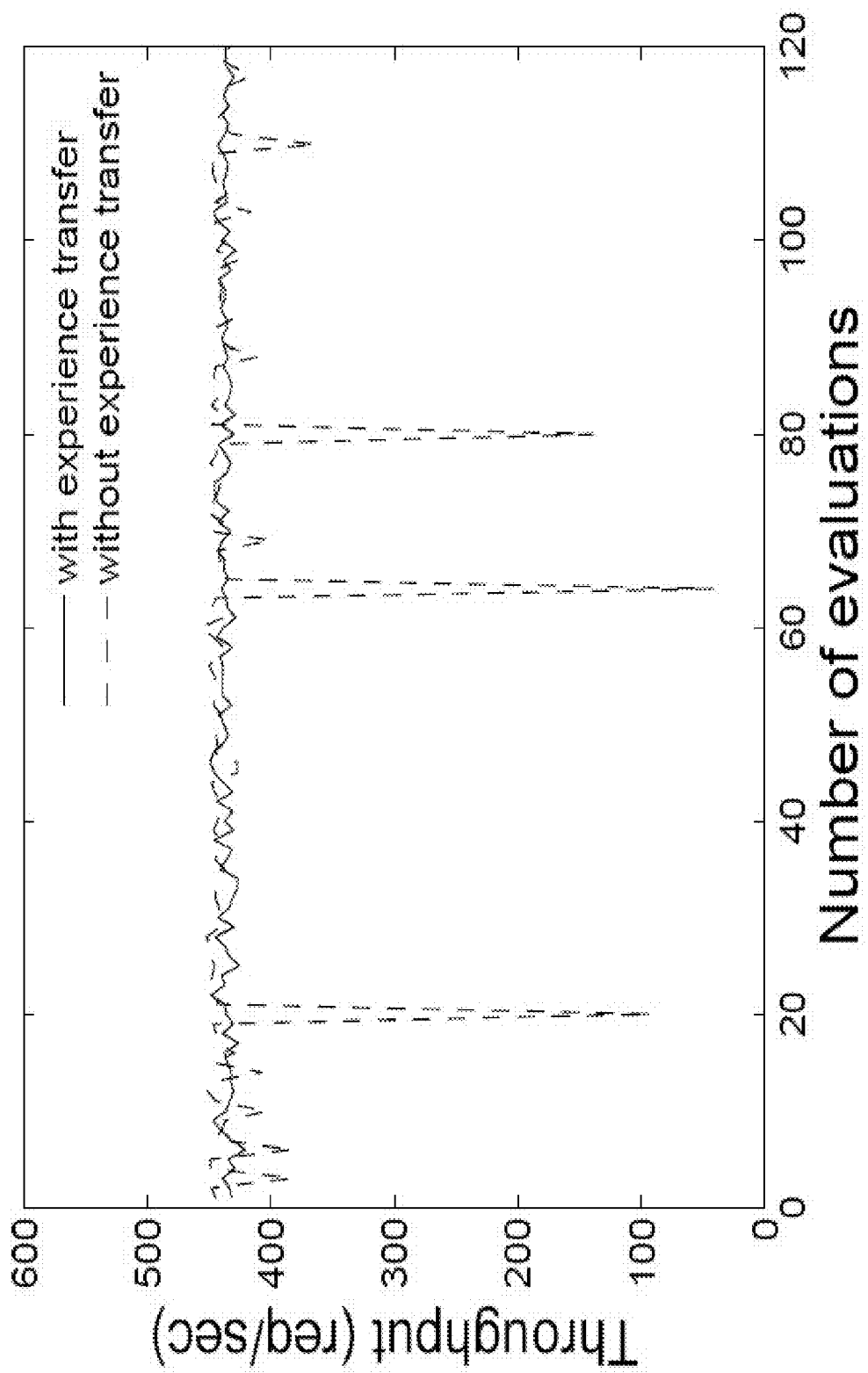

FIG. 13 plots the performance curves produced by the configuration tuning with and without experience transfer, from which we can see that the node addition can considerably increase the system throughput while reducing the request response time. However, it also brings more complexities into the parameter dependency modeling because extra parameters are involved in the system.

In the original system, we have 13 configuration parameters as described in Table 1, whereas in the upgraded system 4 more configurations coming from the newly added application server are involved in the configuration tuning. The introduction of new parameters influences the search efficiencies of both the direct configuration search and experience guided search.

From the results of the direct configuration search, plotted as dashed curves in FIG. 13, we can see that the convergence speed of search process is much slower than those in the previous systems. In the experience guided search, the transferred network from system $S_0$ only records dependencies of the original 13 parameters. We need to discover the complete Bayesian network that includes the newly added configurations. In order to achieve this, the initial Bayesian network for the experience guided search contains two parts: the transferred network from $S_0$, and a set of isolated nodes which denote the newly added configuration parameters.

In the configuration tuning, the algorithm needs to learn the dependencies of newly added parameters as well as utilize the parameter dependencies learned from the transferred network. Therefore, compared with previous upgraded systems, the topology changed system spends more time in discovering the optimal configuration even with the help of transferred experiences. However, we still can see clear improvements of experience guided configuration tuning over the direct configuration search. As shown in the utility curves in FIG. 13(c), while it takes the direct search 110 sample evaluations to reach its best utility, 16.29, the experience guided configuration search only uses 46 sample evaluations to obtain an even better utility, 16.52.

Figure 13C:
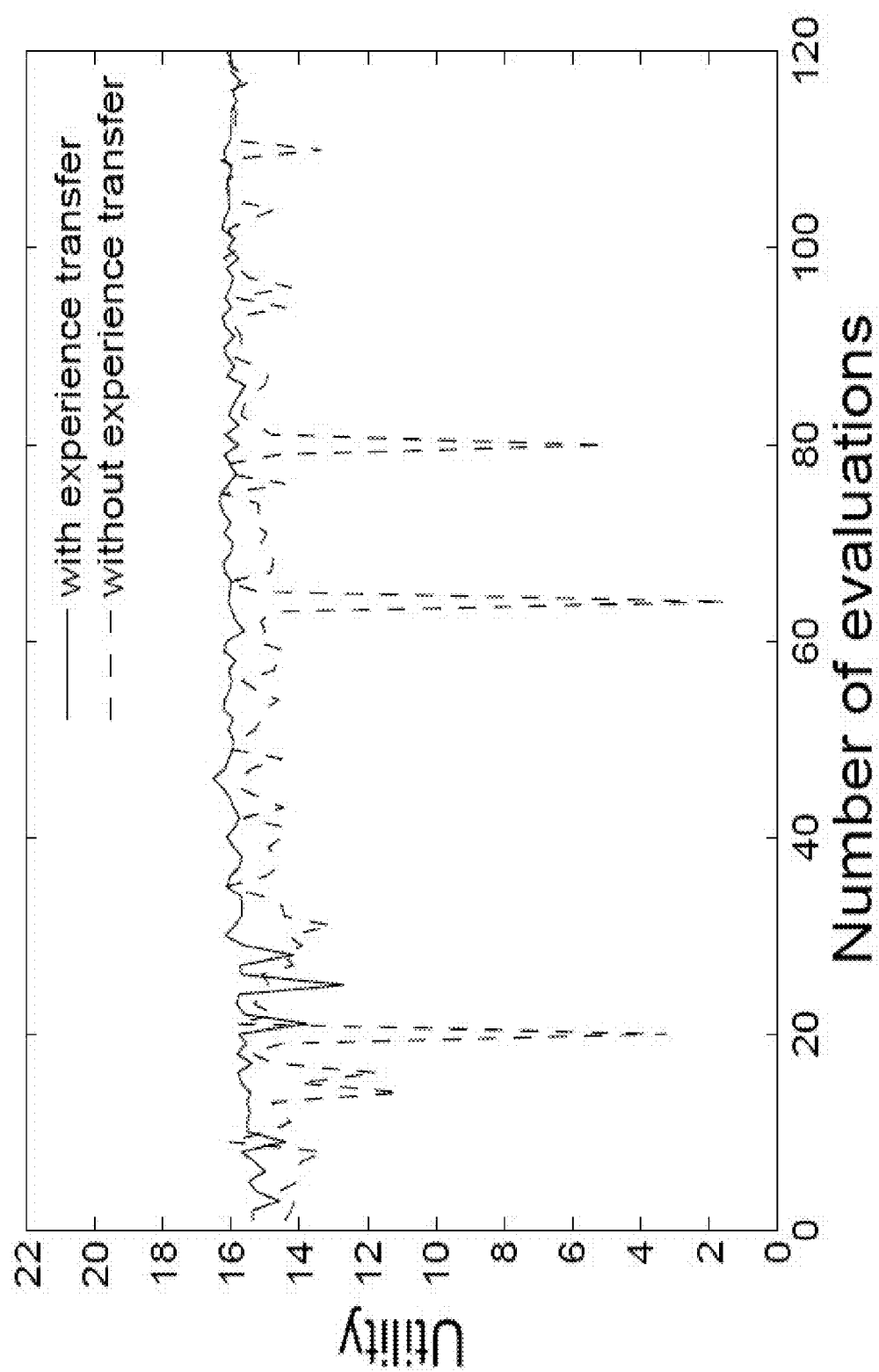

We see from FIG. 13(c) that the direct search method achieves a very high utility, 16.25, at the 12th sample evaluation. In practice, however, the system operators usually have no idea about the optimal utility in the new system until they see convergence behaviors in the utility curve. Therefore, such an early peak in the direct search cannot tell that the algorithm can take that sample as the optimum and then stop the search process. On the other hand, our experience based search already exhibits the convergence behavior, i.e., the low variance of sample utilities, at the time of discovered optimum. We will discuss the convergence testing of configuration search. Note that since the evaluation of the configuration sample is expensive, it is important for the search algorithm to take as few samples as possible to converge to the optimal setting. In that sense, our experience guided search is also superior to the direct search method.

Note that the newly added node is exactly the same as the original node in the application server tier. After we complete the tuning process, we find that the optimal settings identified in the newly added server are very close to the optimal values of configurations in the original application server. This means that our configuration search has discovered the similarities between two application servers and utilized such a fact to determine the optimal configurations. We further look into the Bayesian network learned in $S_1$, and observe that the dependencies of those configurations in the newly added application server are more or less the same as those in the original application server. However, due to the increase of system capacity, some network components related to the web server and database server have been significantly changed compared with the transferred Bayesian network from $S_0$.

For example, the splitting boundaries of the W.MaxClients parameter in the web server and the D. MaxConnections parameter in the database have been replaced with much higher values in the new Bayesian network.

Table 3 summarizes the number of sample evaluations required to discover the optimal configuration as well as the best utility values produced by the above experiments with and without transfer. It shows that transferred experiences can lead to significant time savings in the configuration tuning. The direct configuration search always takes more than 100 sample evaluations to reach its optimum, whereas the experience guided search only needs tens of samples.

In the hardware upgraded system, we have evaluated only 25 samples to reach the system optimum rather than 109 sample evaluations required by the direct search. Similarly it has taken 117 sample evaluations for the direct search to identify the optimal setting in the software updated system, while the experience guided search only uses 11 samples to obtain an even better solution. In the node added system, the experience guided search needs 46 sample evaluations to discover the optimal configuration. But it is still much faster than the direct search which requires 110 sample evaluations. In addition, the best utility discovered by the experience guided search is much higher than that obtained by the direct search.

In the above experiments shown in Table 3, we fix the total number of sample evaluations and use the best identified configuration for analysis and comparison. In practice we may need a criterion to measure the convergence of the configuration search so that the tuning process can be adaptively stopped whenever the convergence behavior is observed. While the visual inspection for sample utility curves may give some hints, we can develop more advanced ways to test the convergence of configuration search. For example, if we observe that during T consecutive sample evaluations, the difference between the maximum and minimum utilities is within a certain range $\delta$, we can make the decision to stop the search. We have not evaluated such convergence criterion because the value of T and δ may vary with different tuning tasks as well as the operators' expectations.

Those skilled in the art will readily appreciate that while we have only considered three exemplary, commonly encountered scenarios in system evolution, we believe our experience transfer can deal with most of the routine changes in computing systems. This is because the server software usually remains the same, except for some version updates, during the lifecycle of the system.

For example, if the system uses WebLogic or WebSphere as the application server, that server software will not change unless the system undergoes significant reconstruction or redesign. Since most of the configuration parameters that affect the system performance come from the server software, their dependencies will not experience significant changes during system evolution.

However, we acknowledge that our experience transfer is not a panacea that can deal with all system upgrades. The system may encounter some substantial alterations which render our transfer mechanism no longer feasible. But we believe that system operators have the capability to distinguish between such situation and normal system variations. It is up to them to decide whether to use 'transfer' or 'tuning from scratch.

This paper has proposed the experience transfer to improve the efficiencies of configuration tuning in computing systems. We have treated the dependencies between system configuration parameters as useful experiences in configuration tuning We have proposed a Bayesian network guided tuning algorithm to discover the optimal configuration setting. After the tuning has been completed, we can obtain a Bayesian network that records the parameter dependencies in the original system. Such parameter dependency knowledge has been successfully embedded to accelerate the configuration searches in other systems. Experimental results have demonstrated that with the help of transferred experiences we can achieve significant time savings for the configuration tuning task.

At this point, while we have discussed and described the invention using some specific examples, those skilled in the art will recognize that our teachings are not so limited. Accordingly, the invention should be only limited by the scope of the claims attached hereto.

TABLE 1

| | name | min value | max value | default value |
|---|---|---|---|---|
| 1 | W.RequestTimeout | 50 | 500 | 300 |
| 2 | W.KeepAliveTimeout | 5 | 20 | 15 |
| 3 | W.MaxClients | 1 | 256 | 150 |
| 4 | A.KeepAliveTime | 10000 | 178000 | 60000 |
| 5 | A.MaximumPoolSize | 8 | 20 | 10 |
| 6 | A.MaximumQueueSize | 500 | 3300 | 1000 |
| 7 | A.TransactionTimeout | 200 | 900 | 300 |
| 8 | D.MaxConnections | 60 | 900 | 100 |
| 9 | D.KeyBufferSize | 8388600 | $3.9 \times 10^9$ | 8388600 |
| 10 | D.TableCache | 64 | 900 | 64 |
| 11 | D.WaitTimeout | 3600 | 54000 | 28800 |
| 12 | D.MaxAllowedPacket | 1048576 | $9 \times 10^8$ | 1048576 |
| 13 | D.QueryCacheSize | 0 | 4196 | 0 |

TABLE 2

| | default | RRS | CMA | BN |
|---|---|---|---|---|
| request response time | 585.3 | 72.0 | 46.5 | 47.0 |
| system throughput | 240.6 | 246.1 | 255.9 | 258.4 |
| overall utility | 4.28 | 8.42 | 9.08 | 9.11 |

TABLE 3

| | without transfer | | with transfer | |
|---|---|---|---|---|
| | evaluations | utility | evaluations | utility |
| original system | 132 | 9.11 | — | — |
| hardware upgrade | 109 | 12.25 | 25 | 12.27 |
| software update | 117 | 9.52 | 11 | 9.58 |
| topology change | 110 | 16.29 | 46 | 16.52 |

The invention claimed is:

1. A computer implemented method for configuring and tuning computing systems comprising the computer implemented steps of:
    determining a set of transferable experiences for a first computing system $S_0$ and representing that set of transferable experiences in a Bayesian network model;
    extracting the set of transferable experiences from the first computing system $S_0$ during the modeling; and
    embedding the extracted set of transferable experiences into a new computing system $S_1$;
    wherein the transferable experiences reflect common characteristics of the two systems such that they remain valid after transfer to the new computing system, are related to a knowledge of managing the systems learned through the operation of the first computing system, and are expressed as hidden dependencies among system configuration parameters that cannot be manually specified by system operators.

2. The computer implemented method of claim 1 further comprising the step of:
    tuning the configuration of the first computing system $S_0$ by performing a Bayesian network tuning configuration of the extracted set of transferable experiences prior to embedding wherein the Bayesian network is first constructed given a population of configuration samples and an output includes a network structure that represents the dependency relationships between configuration parameters as well as a joint distribution model that has been encoded by the dependency knowledge.

3. The computer implemented method of claim 2 wherein said embedded set of transferable experiences are represented as a Bayesian network.

4. The computer implemented method of claim 2 wherein the Bayesian network is incrementally constructed given a sequence population of configuration samples based on a minimum number of samples.

* * * * *